US012591157B2

(12) United States Patent
Watanabe et al.

(10) Patent No.: US 12,591,157 B2
(45) Date of Patent: Mar. 31, 2026

(54) LIGHTING DEVICE

(71) Applicant: Sharp Display Technology Corporation, Kameyama City (JP)

(72) Inventors: Hisashi Watanabe, Kameyama City (JP); Hirotoshi Yasunaga, Kameyama City (JP)

(73) Assignee: Sharp Display Technology Corporation, Kameyama City (JP)

( * ) Notice: Subject to any disclaimer, the term of this patent is extended or adjusted under 35 U.S.C. 154(b) by 0 days.

(21) Appl. No.: 19/169,727

(22) Filed: Apr. 3, 2025

(65) Prior Publication Data

US 2025/0328047 A1 Oct. 23, 2025

(30) Foreign Application Priority Data

Apr. 22, 2024 (JP) ................................. 2024-069119

(51) Int. Cl.
G02F 1/13357 (2006.01)

(52) U.S. Cl.
CPC .............................. G02F 1/133605 (2013.01)

(58) Field of Classification Search
CPC ......... G02F 1/133605; G02F 1/133603; F21Y 2105/00; F21Y 2105/12; F21Y 2105/14; F21Y 2105/16; F21Y 2113/20; F21V 7/0083; H10H 29/142
See application file for complete search history.

(56) References Cited

U.S. PATENT DOCUMENTS

| | | | | |
|---|---|---|---|---|
| 2012/0147589 A1* | 6/2012 | Farmer | ................. | F21V 7/0083 |
| | | | | 362/235 |
| 2012/0161161 A1* | 6/2012 | Schubert | .............. | H10H 29/142 |
| | | | | 257/E33.056 |
| 2013/0051017 A1* | 2/2013 | Heim | .................... | F21V 7/0083 |
| | | | | 29/428 |
| 2018/0217449 A1* | 8/2018 | Mifune | ............. | G02F 1/133605 |
| 2018/0352621 A1* | 12/2018 | Wang | ..................... | H05B 45/48 |
| 2019/0285246 A1 | 9/2019 | Yamamoto et al. | | |
| 2020/0166804 A1* | 5/2020 | Zheng | ............... | G02F 1/133608 |
| 2021/0317970 A1* | 10/2021 | Yamada | ............. | H10H 20/0137 |

(Continued)

FOREIGN PATENT DOCUMENTS

| | | | | |
|---|---|---|---|---|
| JP | 7033512 B2 | * | 3/2022 | |
| JP | 2023105349 A | * | 7/2023 | ....... G02F 1/133605 |
| WO | 2018-066209 A1 | | 4/2018 | |

*Primary Examiner* — Erin Kryukova
(74) *Attorney, Agent, or Firm* — ScienBiziP, P.C.

(57) ABSTRACT

A lighting device includes a plurality of light sources disposed side by side in a row direction and a column direction in one plane, a substrate on which the plurality of light sources are mounted, and a reflection member disposed covering the mounting surface of the substrate. The reflection member includes a plurality of insertion holes through which the light sources are respectively inserted, and a plurality of wall portions surrounding corresponding insertion holes of the plurality of insertion holes. A plane of the reflection member is partitioned into a plurality of reflective regions by the plurality of wall portions. The plurality of light sources are respectively disposed inside the reflective regions. An outer reflective region located at an outer periphery among the plurality of reflective regions has an area smaller than the area of an inner reflective region located on the inner side of the outer reflective region.

8 Claims, 21 Drawing Sheets

(56) References Cited

U.S. PATENT DOCUMENTS

2021/0325020 A1    10/2021  Yamamoto et al.
2022/0163185 A1     5/2022  Yamamoto et al.
2022/0308272 A1*    9/2022  Hashimoto  .............. G02B 5/09

* cited by examiner

FIG. 1

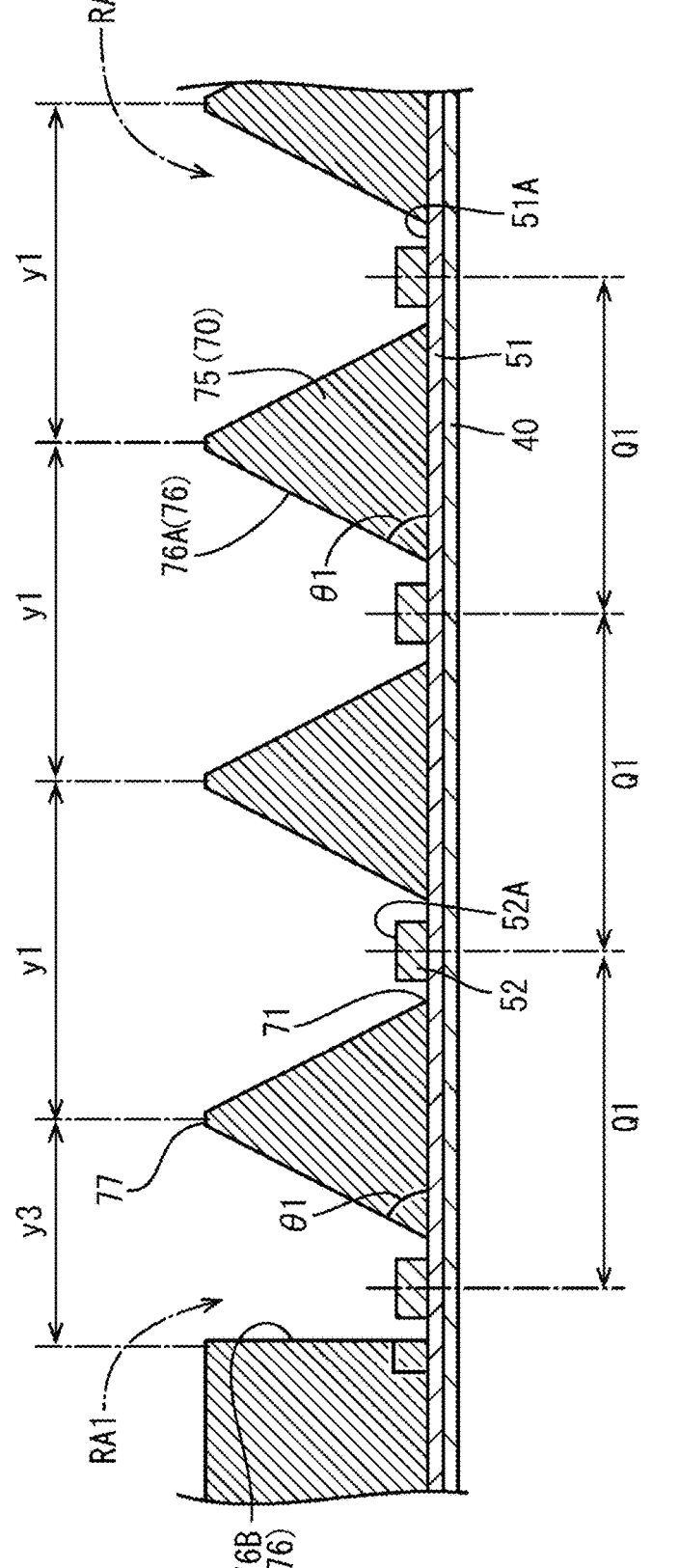
FIG. 11
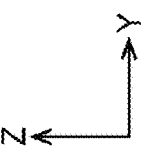

50

| 100 | 100 | 90 | 90 | 90 | 90 | 90 | 90 | 90 | ... | 90 | 90 | 100 | 100 |
|---|---|---|---|---|---|---|---|---|---|---|---|---|---|
| 100 | 75 | 70 | 67 | 67 | 67 | 67 | 67 | 67 | ... | 67 | 70 | 75 | 100 |
| 85 | 70 | 65 | 65 | 65 | 65 | 65 | 65 | 65 | ... | 65 | 65 | 70 | 85 |
| 85 | 67 | 65 | 65 | 65 | 65 | 65 | 65 | 65 | ... | 65 | 65 | 67 | 85 |
| ⋮ | ⋮ | ⋮ | ⋮ | ⋮ | ⋮ | ⋮ | ⋮ | ⋮ | ⋮ | ⋮ | ⋮ | ⋮ | ⋮ |
| 85 | 67 | 65 | 65 | 65 | 65 | 65 | 65 | 65 | ... | 65 | 65 | 67 | 85 |
| 85 | 67 | 65 | 65 | 65 | 65 | 65 | 65 | 65 | ... | 65 | 65 | 67 | 85 |
| 85 | 67 | 65 | 65 | 65 | 65 | 65 | 65 | 65 | ... | 65 | 65 | 67 | 85 |
| 85 | 67 | 65 | 65 | 65 | 65 | 65 | 65 | 65 | ... | 65 | 65 | 67 | 85 |
| 85 | 70 | 65 | 65 | 65 | 65 | 65 | 65 | 65 | ... | 65 | 65 | 70 | 85 |
| 100 | 75 | 70 | 67 | 67 | 67 | 67 | 67 | 67 | ... | 67 | 70 | 75 | 100 |
| 100 | 100 | 90 | 90 | 90 | 90 | 90 | 90 | 90 | ... | 90 | 90 | 100 | 100 |

FIG. 17

LIGHTING DEVICE

CROSS-REFERENCE TO RELATED APPLICATIONS

This application claims the benefit of priority to Japanese Patent Application Number 2024-069119 filed on Apr. 22, 2024. The entire contents of the above-identified application are hereby incorporated by reference.

BACKGROUND

Technical Field

The disclosure relates to a lighting device.

In the related art, a so-called direct type backlight device in which a light source is disposed over the entire back side of a liquid crystal panel is known as a lighting device used in a liquid crystal display device, and an example thereof is disclosed in PCT International Publication No. WO2018/066209. The lighting device disclosed in PCT International Publication No. WO2018/066209 includes a reflecting wall having a horizontal portion with insertion holes through which a plurality of light-emitting elements are individually inserted, and an inclined portion surrounding each of the light-emitting elements inserted into the insertion holes. The reflecting wall has a shape in which the inclined portion surrounds the light-emitting elements in a lattice pattern in a plan view. According to such a configuration, light emitted from the light-emitting elements is more likely to be directed evenly toward the liquid crystal panel by the reflecting wall.

SUMMARY

According to the above-described reflecting wall, light from the light-emitting elements is directed toward the liquid crystal panel and also propagates to a certain extent in the plane. In an outer peripheral edge portion (frame portion) in the plane of the backlight device, the number of peripheral light-emitting elements is smaller than that in a central portion, and the amount of light propagated from the peripheral light-emitting elements is small. For this reason, a brightness is likely to decrease at an outer peripheral edge portion in the plane of the backlight device, and when the backlight device has a rectangular shape in a plan view, corner portions are likely to be darkest.

The technology described in this specification has been completed based on the above-described circumstances, and an object thereof is to curb brightness unevenness in a lighting device.

(1) A lighting device according to the present technology includes a plurality of light sources disposed side by side in a row direction and a column direction in one plane, a substrate on which the plurality of light sources are mounted, and a reflection member disposed covering the mounting surface of the substrate, in which the reflection member includes a plurality of insertion holes through which the light sources are respectively inserted, and a plurality of wall portions erected surrounding corresponding insertion holes of the plurality of insertion holes, a plane of the reflection member is partitioned into a plurality of reflective regions in a lattice pattern by the plurality of wall portions, the plurality of light sources are respectively disposed inside the reflective regions, and an outer reflective region located at an outer periphery among the plurality of reflective regions arranged in the lattice pattern has an area smaller than an area of an inner reflective region located on an inner side of the outer reflective region.

(2) In addition to (1), in the lighting device, the plurality of light sources may be arranged at the same pitch, a light source in the inner reflective region of the light sources may be disposed at a central portion of the inner reflective region, and a light source in the outer reflective region of the light sources may be disposed closer to an outer peripheral side of the reflection member.

(3) In addition to (1), in the lighting device, the plurality of light sources may be respectively disposed at central portions in the reflective regions.

(4) In addition to any one of (1) to (3), in the lighting device, the wall portions may each have an inclined shape allowing the reflective region to spread from the substrate side toward a distal end side in a protrusion direction of the wall portions.

(5) In addition to (4), in the lighting device, a wall portion of the outer reflective region of the wall portions may have a larger inclination angle with respect to the substrate than a wall portion of the inner reflective region of the wall portions.

(6) In addition to any one of (1) to (5), in the lighting device, a higher power may be applied to a light source disposed in the outer reflective region of the light sources than to a light source disposed in the inner reflective region of the light sources.

(7) In addition to any one of (1) to (6), in the lighting device, a light source disposed in the outer reflective region of the light sources may have a larger amount of luminous flux than a light source disposed in the inner reflective region of the light sources.

(8) In addition to any one of (1) to (7), in the lighting device, a light source disposed in the outer reflective region of the light sources may have a lower voltage than a light source disposed in the inner reflective region of the light sources.

According to the present technology, it is possible to curb brightness unevenness in a lighting device.

BRIEF DESCRIPTION OF DRAWINGS

The disclosure will be described with reference to the accompanying drawings, wherein like numbers reference like elements.

FIG. 1 is an exploded perspective view of a liquid crystal display device including a backlight device according to a first embodiment.

FIG. 11 is a cross-sectional view taken along line V-V in FIG. 9.

FIG. 17 is a diagram illustrating a power distribution in each dimming region according to Example 2.

DESCRIPTION OF EMBODIMENTS

First Embodiment

Figure 1:
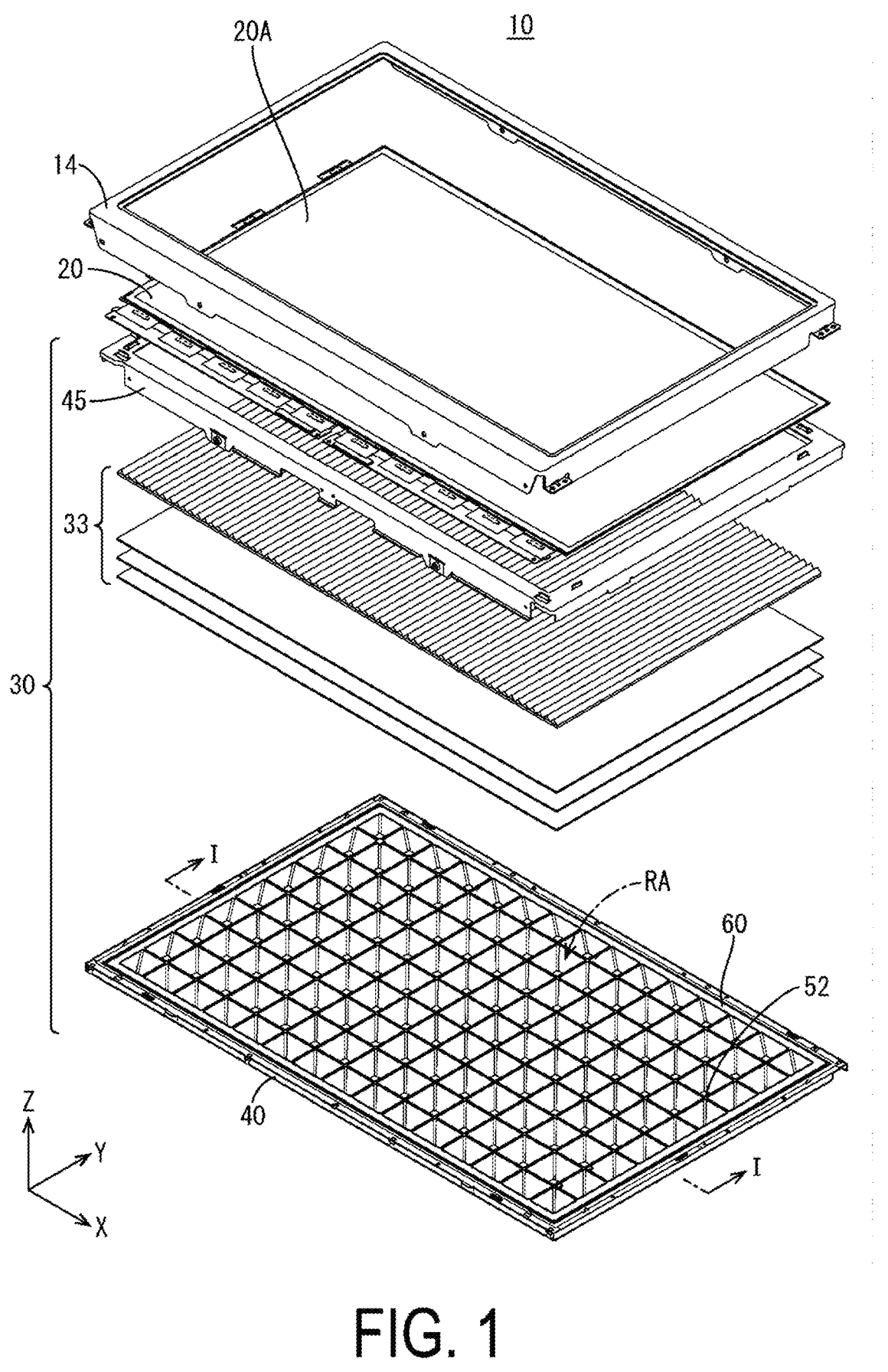
Figure 2:
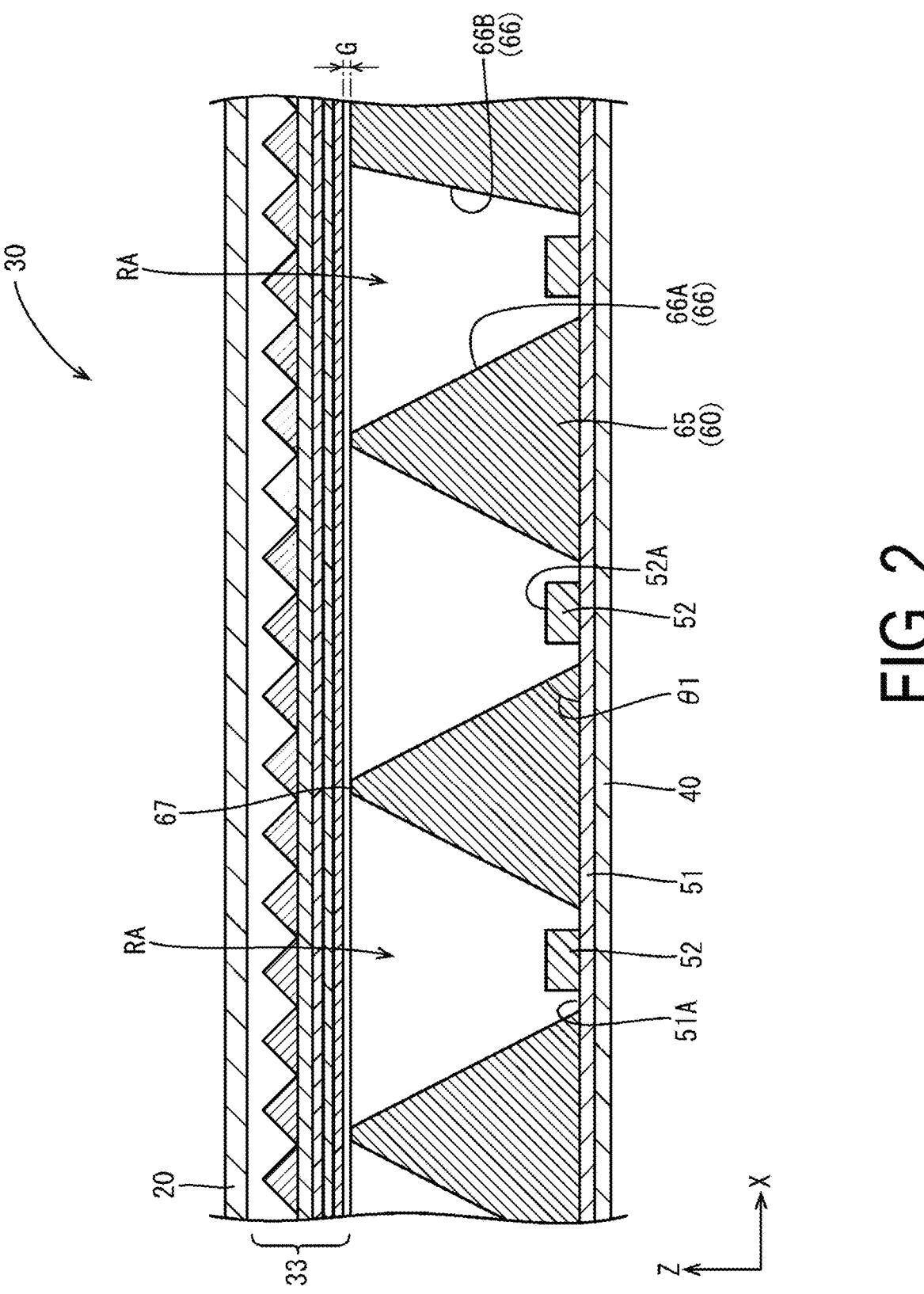
FIG. 2 is a partially enlarged cross-sectional view of the liquid crystal display device taken along line I-I in FIG. 1.

A first embodiment will be described with reference to FIGS. 1 to 8. In this embodiment, a liquid crystal display device 10 including a backlight device 30 (an example of a lighting device) is exemplified. In the drawings, an X axis, a Y axis, and a Z axis are illustrated, and each axial direction is illustrated to be a common direction in the drawings. Further, in a Z-axis direction, a liquid crystal panel 20 side is the front side, and a backlight device 30 side is the back side.

As illustrated in FIG. 1, the liquid crystal display device 10 includes the liquid crystal panel 20 that displays images, the backlight device 30 that irradiates the liquid crystal panel 20 with light, and a bezel 14. The liquid crystal panel 20 is sandwiched between the bezel 14 and a frame 45 (described later) of the backlight device 30, with a display surface 20A capable of displaying images facing the front side. The liquid crystal panel 20, the backlight device 30, and the liquid crystal display device 10 in this embodiment have a horizontally elongated rectangular shape as a whole, with the long side direction coinciding with the X-axis direction in each drawing, the short side direction coinciding with the Y-axis direction, and the thickness direction coinciding with the Z-axis direction. However, the shape illustrated in the drawing is merely an example, and may be a vertically long rectangular shape or the like.

As illustrated in FIG. 1, the bezel 14 is a support member disposed on the front side of the liquid crystal panel 20. The bezel 14 extends along an outer peripheral edge portion on the front side of the liquid crystal panel 20, and configures an appearance on the front side of the liquid crystal display device 10. The bezel 14 is made of, for example, a metal having excellent rigidity (stainless steel, aluminum, or the like).

As illustrated in FIGS. 1 and 2, the backlight device 30 includes a plurality of LEDs (an example of a light source) 52, an LED substrate 51 (an example of a substrate) on which the LEDs 52 are mounted, a reflection member 60, a chassis 40, a plurality of types of optical sheets 33, and a frame 45. The LEDs 52 are disposed side by side in a planar shape on the back side (lower side) of the liquid crystal panel 20, and the backlight device 30 is a so-called direct type.

The chassis 40 has a horizontally elongated shallow rectangular tray shape that is open toward the light-emitting side (front side, liquid crystal panel 20 side), and the LED substrate 51 (see FIG. 2) is installed on the bottom thereof. The chassis 40 is made of a resin such as white polycarbonate, for example. The frame 45 has a frame shape and is made of, for example, a metal (stainless steel, aluminum, or the like).

The bezel 14, the frame 45, and the chassis 40 integrally hold the liquid crystal panel 20 and the backlight device 30. A tape-shaped member may be appropriately attached to the bezel 14 and the frame 45 for fixation and light shielding. In addition, the bezel 14 and the frame 45 may have a non-frame shape, or only one of them may be provided.

The optical sheet 33 has a horizontally elongated rectangular shape as illustrated in FIG. 1, and is disposed between the reflection member 60 and the liquid crystal panel 20 to impart a predetermined optical effect to the light from the LEDs 52. Various types of optical sheets 33 are known, and one type or a plurality of types are appropriately used in accordance with an application of the liquid crystal display device 10, and the like.

For example, when a light diffuser sheet is used as the optical sheet 33, in-plane uniformity can be improved by imparting a diffusion effect to light. The thickness of the light diffuser sheet is, for example, in the range of approximately 30 μm to approximately 3 mm. In addition, for example, when a brightness enhancement sheet is used as the optical sheet 33, a light condensing effect is imparted to emitted light, and the front brightness can be enhanced. For example, a brightness enhancement film (BEF) (trade name) and a dual brightness enhancement film (DBEF) (trade name) manufactured by 3M Company can be used as the brightness enhancement sheet. Other specific examples of the optical sheet 33 include a dichroic sheet (dichroic filter), a turning lens, a prism sheet (an optical sheet having a prism or lens shape except for a brightness enhancement sheet and a turning lens), and a light diffuser sheet.

Figure 3:
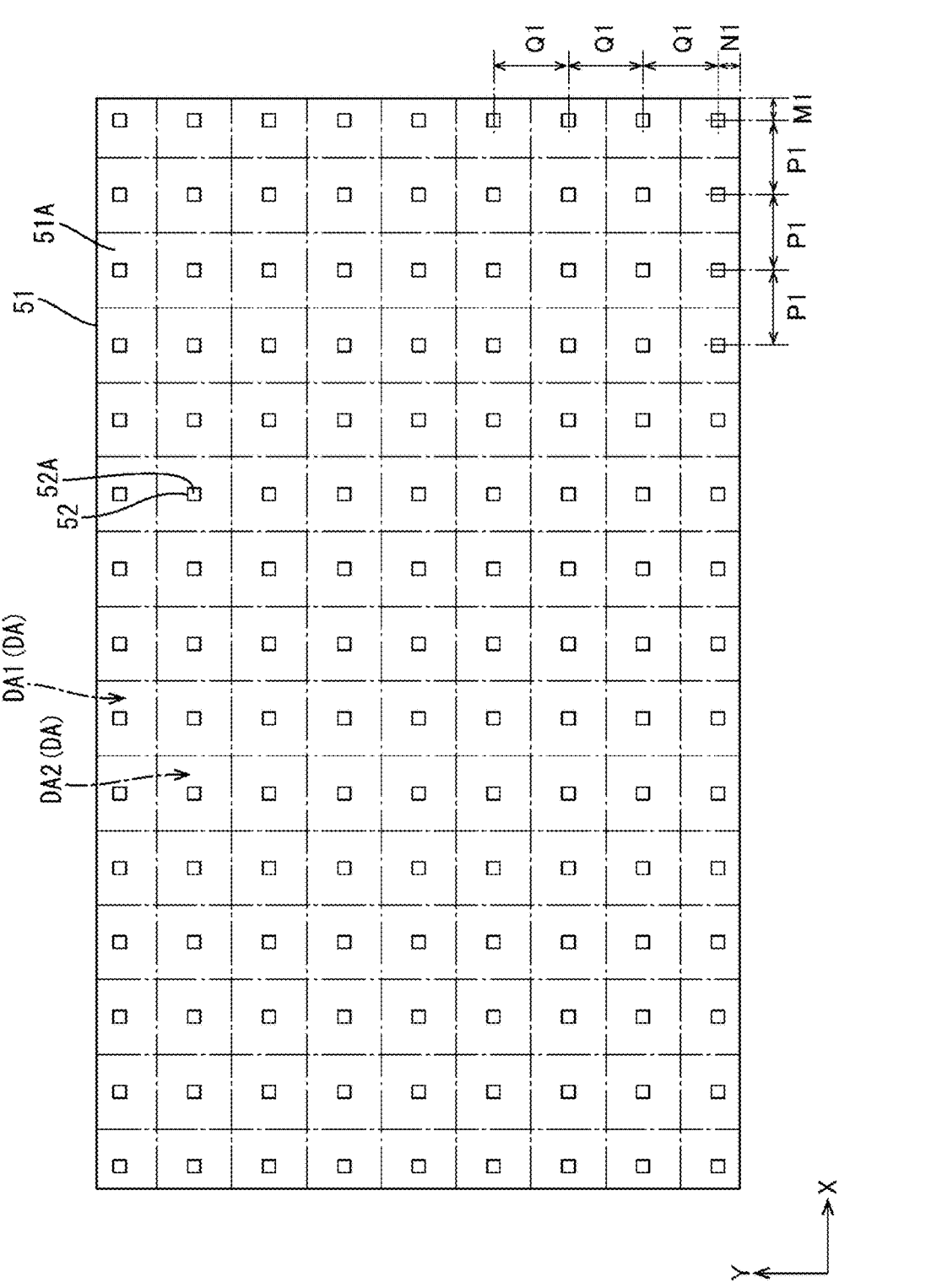
FIG. 3 is a plan view of an LED and an LED substrate.

As illustrated in FIG. 3, the LEDs 52 are disposed in a lattice (matrix) on the front main surface (mounting surface 51A) of the rectangular LED substrate 51 at equal intervals (same pitch) in the X-axis direction (row direction) and the Y-axis direction (column direction). The LED 52 has a rectangular parallelepiped shape and is a so-called top emission type (top-view type) in which its bottom surface is disposed on the mounting surface 51A and its upper surface on a side opposite to the bottom surface serves as a light-emitting surface 52A (see FIG. 2). An optical axis of the LED 52 (a traveling direction of light in which a light emission intensity of emitted light is highest (peak)) is the Z-axis direction.

The LED 52 is preferably a white light-emitting type, and a miniaturized package such as a chip scale package (CSP) or a flip chip type may be used. Further, the LED 52 may be a so-called mini LED or micro LED in which the area of the light-emitting surface 52A is as small as approximately 1.0 mm or less. When a monochromatic light-emitting type (for example, a blue light-emitting type) is used as the LED 52, wavelength conversion sheets (color converting sheets) are used in combination in order to emit white combined light (mixed light). The type of wavelength conversion sheet is not limited as long as it can convert the wavelength of primary light into the wavelength of secondary light included in a different wavelength area. For example, a wavelength conversion sheet containing a quantum dot phosphor, an inorganic phosphor, or an organic phosphor can be used.

The LED substrate 51 has a horizontally elongated rectangular shape and has a configuration in which a wiring line pattern made of a conductive material is formed on a base material. For example, an aluminum substrate or a glass epoxy substrate is used as the LED substrate 51, but a flexible substrate (FPC) or the like having excellent flexibility may be used.

As illustrated in FIG. 3, the mounting surface 51A of the LED substrate 51 is divided into a plurality of dimming regions (segment regions) DA arranged in a matrix without a gap. In this embodiment, each of the dimming regions DA has a rectangular shape and includes one LED 52. The dimming region DA has a size including at least one LED 52.

In this embodiment, a dimming region DA1 including the outer peripheral edge portion of the LED substrate 51 has a smaller area than a dimming region DA2 (the dimming region DA not including the outer peripheral edge portion of the LED substrate 51) on the inner side thereof. That is, a distance (M1 in the X-axis direction and N1 in the Y-axis direction) from the LED 52 disposed adjacent to the outer peripheral edge portion (end) of the LED substrate 51 to the outer peripheral edge portion of the LED substrate 51 is smaller than ½ of the pitch (P1 in the X-axis direction and Q1 in the Y-axis direction) of the LED 52 (N1<P1/2, M1<Q1/2).

Driving power is supplied to the LEDs 52 from an external power source via the wiring line pattern formed on the LED substrate 51. In the backlight device 30, the wiring line pattern and the like are configured to perform local dimming driving in which driving power supplied to the LED 52 is independently controlled for each of the dimming regions DA. The driving power is controlled by a control unit provided in the liquid crystal display device 10. Thereby, the amount of luminous flux of the LED 52 can be locally adjusted for each dimming region DA. The backlight device 30 and the liquid crystal display device 10 are capable of high-definition, high-contrast brightness adjustment and low power consumption through local dimming driving.

Figure 4:
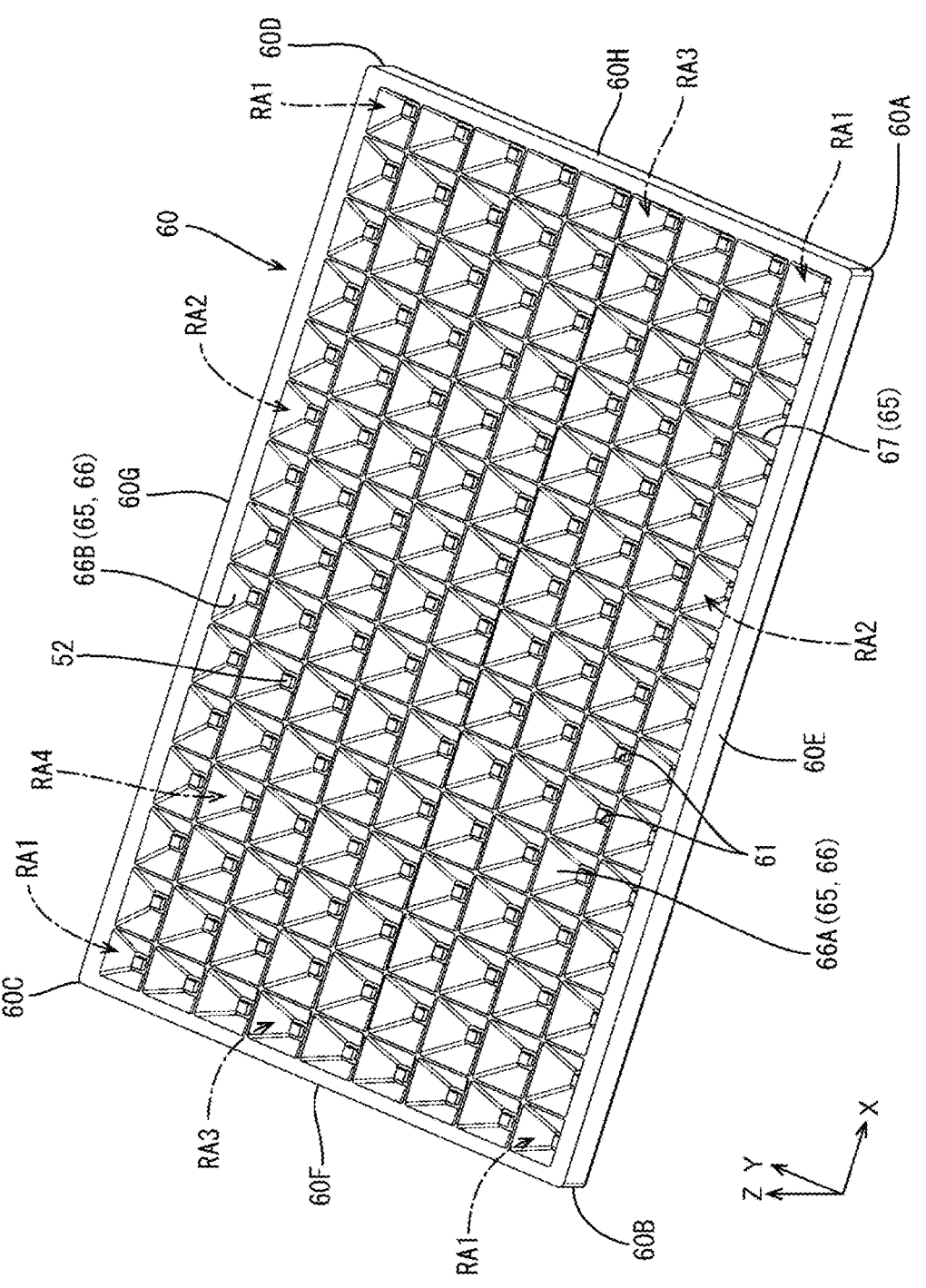
FIG. 4 is a perspective view of an LED, an LED substrate, and a reflection member.
Figure 5:
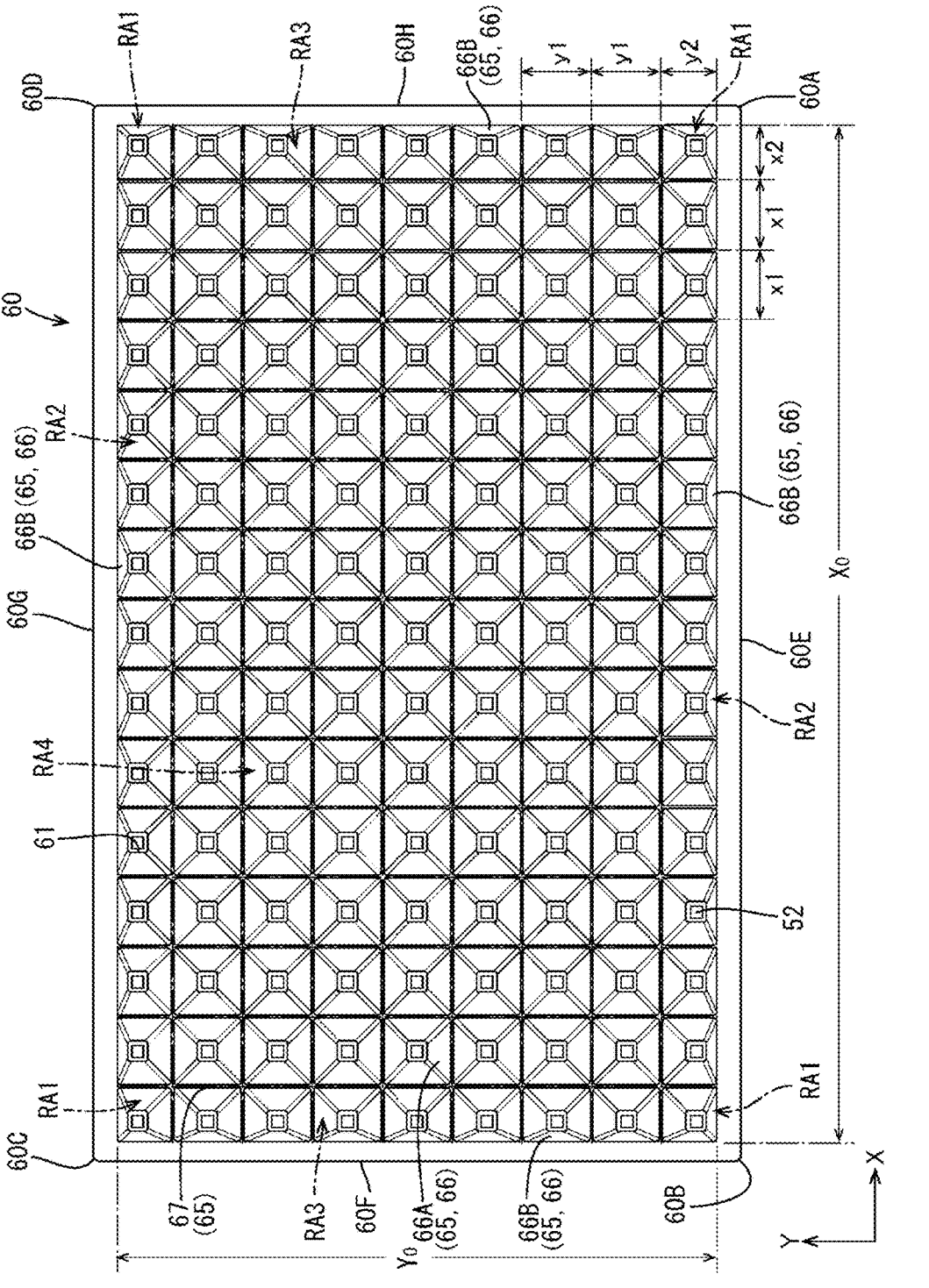
FIG. 5 is a plan view of an LED, an LED substrate, and a reflection member.
Figure 6:
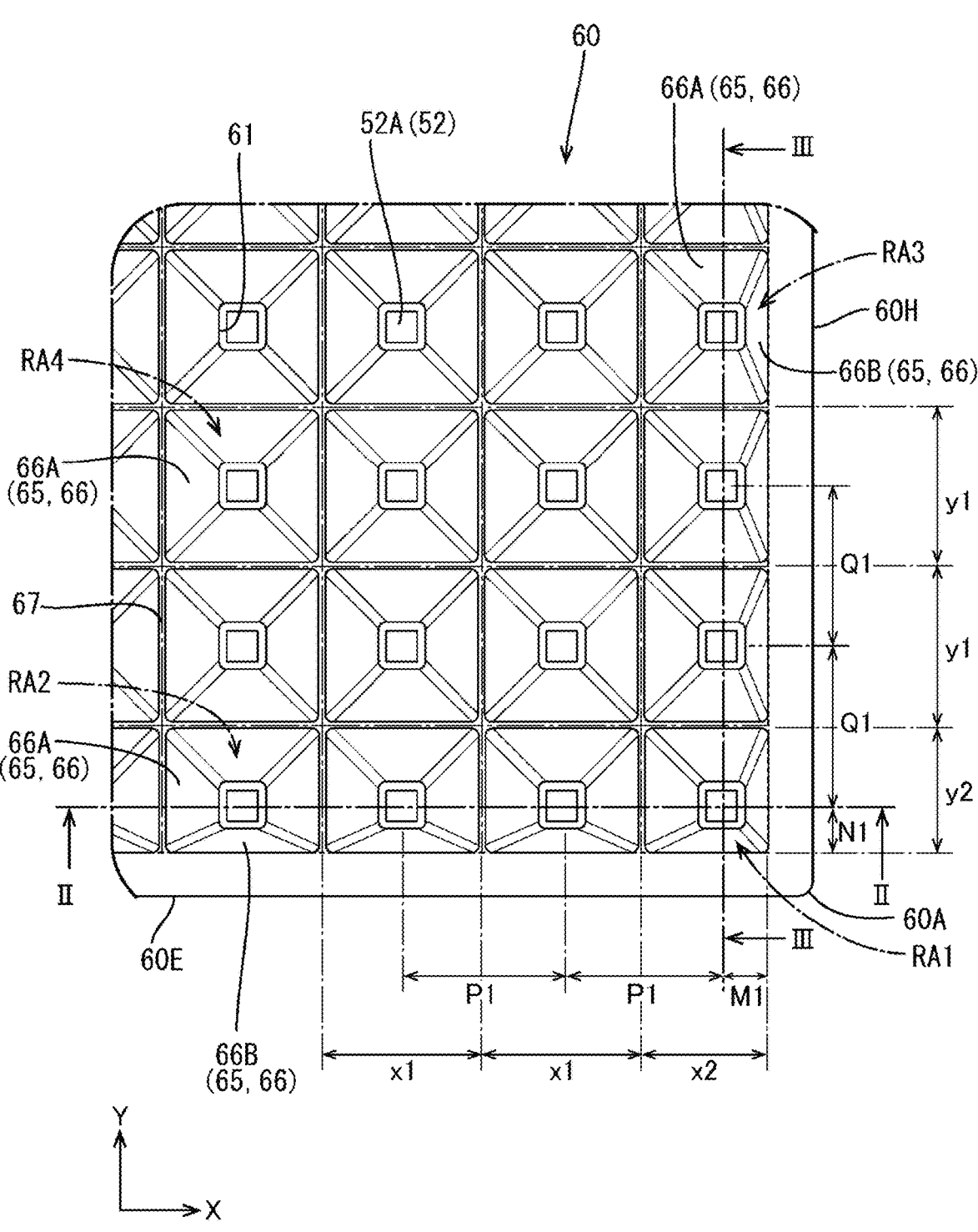
FIG. 6 is a partially enlarged plan view of an LED, an LED substrate, and the vicinity of a corner portion of a reflection member.

The reflection member 60 is installed on the mounting surface 51A of the LED substrate 51 and is fixed in close contact with the mounting surface 51A so as to cover the entire mounting surface 51A from the front side. As illustrated in FIGS. 4 to 6, the reflection member 60 has a horizontally elongated rectangular shape in a plan view and has four corner portions 60A, 60B, 60C, and 60D and four side portions 60E, 60F, 60G, and 60H. The reflection member 60 is made of, for example, a resin such as white polycarbonate having excellent light reflectance, and the portions are integrally formed.

The reflection member 60 includes a plurality of insertion holes 61 and a plurality of wall portions 65. The insertion hole 61 has a shape and a size through which at least one LED 52 can be inserted. Each insertion hole 61 according to this embodiment has a rectangular shape, and has a size through which one side LED 52 is inserted. In the drawing, the LED 52 and the mounting surface 51A of the LED substrate 51 in the vicinity thereof are exposed to the front side from the insertion hole 61, but the insertion hole 61 may be formed to have a size that allows only the light-emitting surface 52A of the LED 52 to be inserted therethrough.

When a part of the mounting surface 51A of the LED substrate 51 is exposed from the insertion hole 61, a reflection sheet that covers the exposed part from the front side may be provided between the mounting surface 51A and the reflection member 60. By providing the reflection sheet, a reflectance can be further improved. As the reflection sheet, for example, a polyester-based or PET-based white resin sheet such as an enhanced specular reflector (ESR) can be used.

The wall portion 65 of the reflection member 60 is formed to surround at least one insertion hole 61 and to be erected. Although the wall portion 65 according to this embodiment surrounds each insertion hole 61 and one LED 52 inserted therethrough, the wall portion 65 may surround the plurality of insertion holes 61 or surround the plurality of LEDs 52 by the plurality of LEDs 52 being inserted into the insertion holes 61.

The plane of the reflection member 60 is partitioned into a plurality of reflective regions RA in a lattice pattern by the wall portions 65. It is preferable that the reflective region RA be provided to partition the dimming region DA unit of the local dimming driving described above. The reflective region RA according to this embodiment is provided to partition one dimming region DA, and the reflective region RA and the dimming region DA have substantially the same size.

In the following description, as illustrated in FIGS. 4 and 5, among the plurality of reflective regions RA, the reflective regions RA located at the corner portions 60A, 60B, 60C, and 60D of the reflection member 60 are assumed to be a first reflective region RA1 (an example of an outer reflective region). Among the plurality of reflective regions RA, reflective regions RA (reflective regions including side portions 60E and 60G), other than the first reflective region RA1, which are arranged at the outermost periphery in the X-axis direction (row direction) are assumed to be a second reflective region RA2 (an example of an outer reflective region), and similarly, among the plurality of reflective regions RA, reflective regions RA (reflective regions including the side portions 60F and 60H), other than the first reflective regions RA1, which are arranged at the outermost periphery in the Y-axis direction (column direction) are assumed to be a third reflective region RA3 (an example of an outer reflective region). In addition, among the plurality of reflective regions RA, a reflective region RA located at the central portion (on the inner side of the outermost periphery) other than the first reflective regions RA1, the second reflective regions RA2, and the third reflective regions RA3 is assumed to be a fourth reflective region RA4 (an example of an inner reflective region).

In the reflection member 60 of this embodiment, the first reflective region RA1, the second reflective region RA2, and the third reflective region RA3 located at the outermost periphery are set to have a smaller area in a plan view than the fourth reflective region RA4 located at the central portion (on the inner side of the outermost periphery). Specifically, as illustrated in FIG. 5, dimensions x2 in the X-axis direction of the first reflective region RA1 and the third reflective region RA3 located at the ends in the X-axis direction are smaller than dimensions x1 in the X-axis direction of the second reflective region RA2 and the fourth reflective region RA4 which are located on the center side in the X-axis direction (x2<x1). In addition, dimensions y2 in the Y-axis direction of the first reflective region RA1 and second reflective region RA2 located at the ends in the Y-axis direction are smaller than dimensions y1 in the Y-axis direction of the third reflective region RA3 and the fourth reflective region RA4 located on the center side in the Y-axis direction (y2<y1). It can also be said that the pitches of the reflective regions RA1, RA2, and RA3 located at the outermost periphery are smaller than the pitch of the reflective region RA4 located at the central portion.

In this embodiment, x1=8.25 mm, x2=5.7 mm, y1=8.25 mm, and y2=5.2 mm. With such a configuration, areas S of the first reflective region RA1, the second reflective region RA2, the third reflective region RA3, and the fourth reflective region RA4 in a plan view are set to satisfy the following relationship: an area S1 of the first reflective region <an area S2 of the second reflective region <an area S3 of the third reflective region <an area S4 of the fourth reflective region. A ratio of the dimensions is preferably in the range of x2/x1=0.3 to 0.7 and y2/y1=0.3 to 0.7.

In this manner, the areas of the reflective regions RA1, RA2 and RA3 disposed in the outermost periphery in a plan view are set to be smaller than the area of the reflective region RA4 in the central portion, and thus the brightness of light confined in the reflective regions RA1, RA2, and RA3 in the outermost periphery can be made relatively higher than the brightness of light in the reflective region RA4 in the central portion. That is, in the backlight device 30, the brightness of the outer peripheral portion having a low brightness in the related art is improved, and brightness unevenness is curbed.

As described above, the plurality of LEDs 52 are disposed in a lattice pattern (matrix pattern) at equal intervals in the X-axis direction (row direction) and the Y-axis direction (column direction) (pitch P1 in the X-axis direction and pitch Q1 in the Y-axis direction, where P1=x1 and Q1=y1). For this reason, the LEDs 52 disposed in the fourth reflective regions RA4 are respectively disposed in the central portions of the regions, while the LEDs 52 respectively disposed in the first reflective region RA1, the second reflective region RA2, and the third reflective region RA3 are disposed at positions closer to the outer peripheral side of the reflection member 60 relative to the central portions in the regions (see FIGS. 5 and 6).

When the plurality of LEDs 52 are disposed at the same pitches P1 and Q1 in this manner, it is easy to obtain the same brightness in the light-emitting surface of the backlight device 30 when constant power is supplied to the LEDs 52, and it is easy to calculate power supplied to the LEDs 52 according to an input image in local dimming in which the light emission intensity of the LEDS 52 is changed in accordance with a display image, which is advantageous in that a circuit scale can be reduced.

Figure 7:
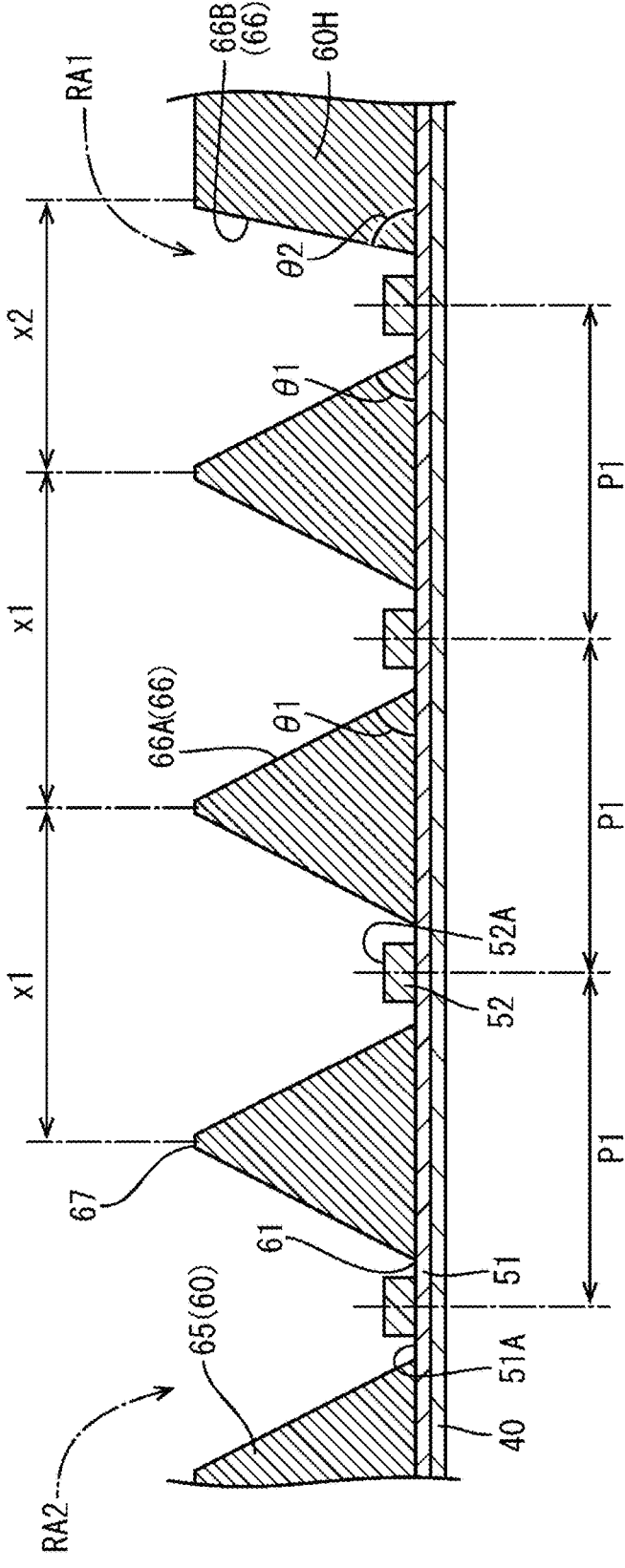
FIG. 7 is a cross-sectional view taken along line II-II in FIG. 6.
Figure 7:
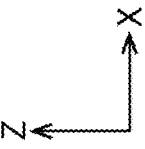
Figure 8:
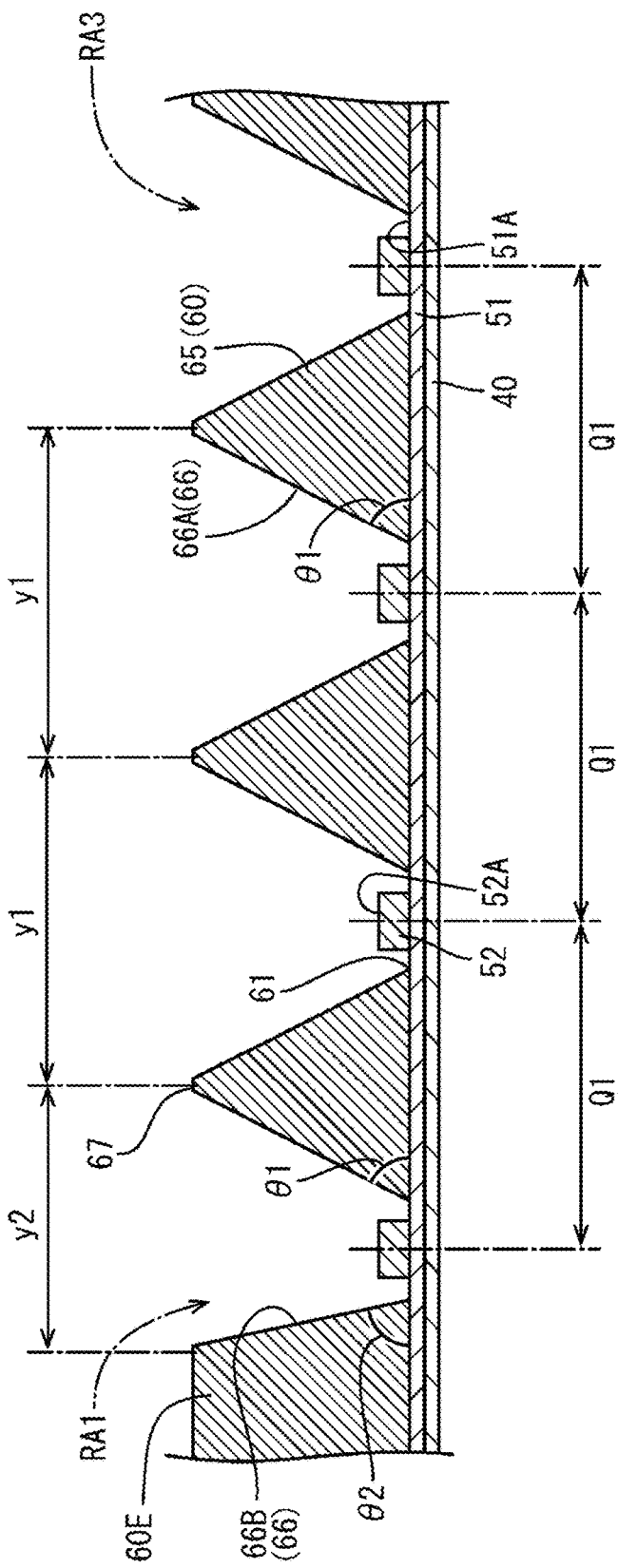
FIG. 8 is a cross-sectional view taken along line III-III in FIG. 6.
Figure 8:
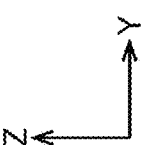

As illustrated in FIGS. 7 and 8, each of the wall portions 65 partitioning the respective reflective regions RA in a lattice pattern protrudes from the LED substrate 51 side toward the front side in a chevron shape in cross section. Wall surfaces 66 of the four wall portions 65 forming one reflective region RA by surrounding one LED 52 has an inclined surface shape which is inclined while spreading in the widthwise direction so that the diameter of each reflective region RA increases from the LED substrate 51 side toward a side opposite (upward) to the LED substrate 51. That is, one reflective region RA is in a state in which each LED 52 is surrounded by four trapezoidal inclined surfaces (wall surfaces 66) in an inverted quadrangular pyramid shape (see FIGS. 4 to 6). Light emitted from the LEDs 52 and reaching the wall surfaces 66 is reflected by the inclined wall surfaces 66 so as to be directed to the front side.

A distal end portion 67 of the wall portion 65 is chamfered, and is disposed with a slight gap G from the back surface of the optical sheet 33 as illustrated in FIG. 2.

Alternatively, the distal end portion 67 of the wall portion 65 may be in contact with the back surface of the optical sheet 33 without a gap. By providing the gaps G, light emitted from the LED 52 surrounded by the wall portion 65 and light emitted from the LED 52 adjacent to the LED 52, that is, light between the adjacent reflective regions RA is easily diffused. However, even when there is no gap G, light between the adjacent reflective regions RA is diffused to a certain extent and spreads in the plane until the light is emitted to the liquid crystal panel 20 through the optical sheet 33.

In the reflection member 60 of this embodiment, the wall surface 66 of the wall portion 65 is set to have different inclination angles with respect to the mounting surface 51A by the reflective regions RA described above. Specifically, wall surfaces 66A of the four wall portions 65 surrounding the LEDs 52 in the fourth reflective region RA4 disposed on the inner side among the plurality of reflective regions RA are all set to be θ1=63 degrees with respect to the mounting surface 51A of the LED substrate 51.

On the other hand, in the second reflective region RA2 and the third reflective region RA3, as illustrated in FIGS. 6 to 8, the angle of the wall surface 66A other than one wall surface 66B disposed on the outer peripheral side of the reflection member 60 is θ1=63 degrees as in the fourth reflective region RA4, but the angle of the wall surface 66B disposed on the outer peripheral side of the reflection member 60 is θ2=78 degrees with respect to the mounting surface 51A of the LED substrate 51, which is set to an angle larger than θ1(θ2>θ1).

Furthermore, in the first reflective region RA1, the angle of the wall surface 66A other than two wall surfaces 66B disposed on the outer peripheral side of the reflection member 60 is θ1=63 degrees as in the fourth reflective region RA4, but the angles of two wall surfaces 66B disposed on the outer peripheral side of the reflection member 60 is θ2=78 degrees with respect to the mounting surface 51A of the LED substrate 51 (θ2>θ1).

In this manner, in the reflective regions RA1, RA2, and RA3 at the outermost periphery, the inclination angle θ2 of the wall surface 66B disposed on the outer peripheral side of the reflection member 60 is made steeper than the inclination angle θ1 of the other wall surface 66A (wall surface disposed on the inner side), and thus light emitted from the LED 52 can be more strongly directed to the front side. A difference between the inclination angles is preferably 10 degrees or more (θ2−θ1>10°). When it is 10 degrees or more, a brightness difference becomes large.

Next, operational effects will be described. The backlight device 30 of this embodiment includes the plurality of LEDs 52 disposed side by side in a row direction and a column direction in one plane, the LED substrate 51 on which the plurality of LEDs 52 are mounted, and the reflection member 60 disposed covering the mounting surface 51A of the LED substrate 51. The reflection member 60 includes a plurality of insertion holes 61 through which the LEDS 52 are respectively inserted and the plurality of wall portions 65 erected surrounding corresponding insertion holes of the insertion holes 61. The plane of the reflection member 60 is partitioned in a lattice pattern into the plurality of reflective regions RA by the plurality of wall portions 65, and the plurality of LEDs 52 are each disposed inside one reflective region RA. Among the plurality of reflective regions RA arranged in the lattice pattern, the plurality of reflective regions RA1, RA2, and RA3 located at the outer periphery have areas smaller than the plurality of reflective regions RA4 located on inner sides of the reflective regions RA1, RA2, and RA3.

According to the above-described configuration, in the reflective regions RA1, RA2, and RA3 on the outer peripheral side where brightness tends to be low in the reflective region RA, light emitted from the reflective regions RA1, RA2, and RA3 is stronger than that in the configuration of the related art in which all of the reflective regions have the same area, and thus brightness unevenness of the entire backlight device 30 can be curbed.

The plurality of LEDs 52 are arranged at the same pitch (P1 in the X-axis direction and Q1 in the Y-axis direction), the LEDs 52 in the fourth reflective regions RA4 may be respectively disposed at central portions of the fourth reflective regions, and the LEDS 52 in the first reflective regions RA1, the second reflective regions RA2, and the third reflective region RA3 disposed at the outermost periphery may be disposed closer to the outer peripheral side of the reflection member 60.

In addition, the wall portions 65 each have an inclined shape allowing the reflective region RA to spread from the LED substrate 51 side toward the distal end side (upward) in the protrusion direction of the wall portions 65. According to such a configuration, light emitted from the LED 52 can be directed upward.

In addition, a part (wall surface 66B) of the wall surface 66 of the wall portion 65 in each of the reflective regions RA1, RA2, and RA3 disposed at the outermost periphery has a larger inclination angle with respect to the LED substrate 51 than the wall surface 66A of the wall portion 65 in the reflective region R4 disposed on the inner side (θ2>θ1). According to such a configuration, in the reflective regions RA1, RA2, and RA3 at the outermost periphery where brightness tends to be low, light emitted from the LED 52 can be directed upward more strongly.

Modification Example of First Embodiment

Figure 9:
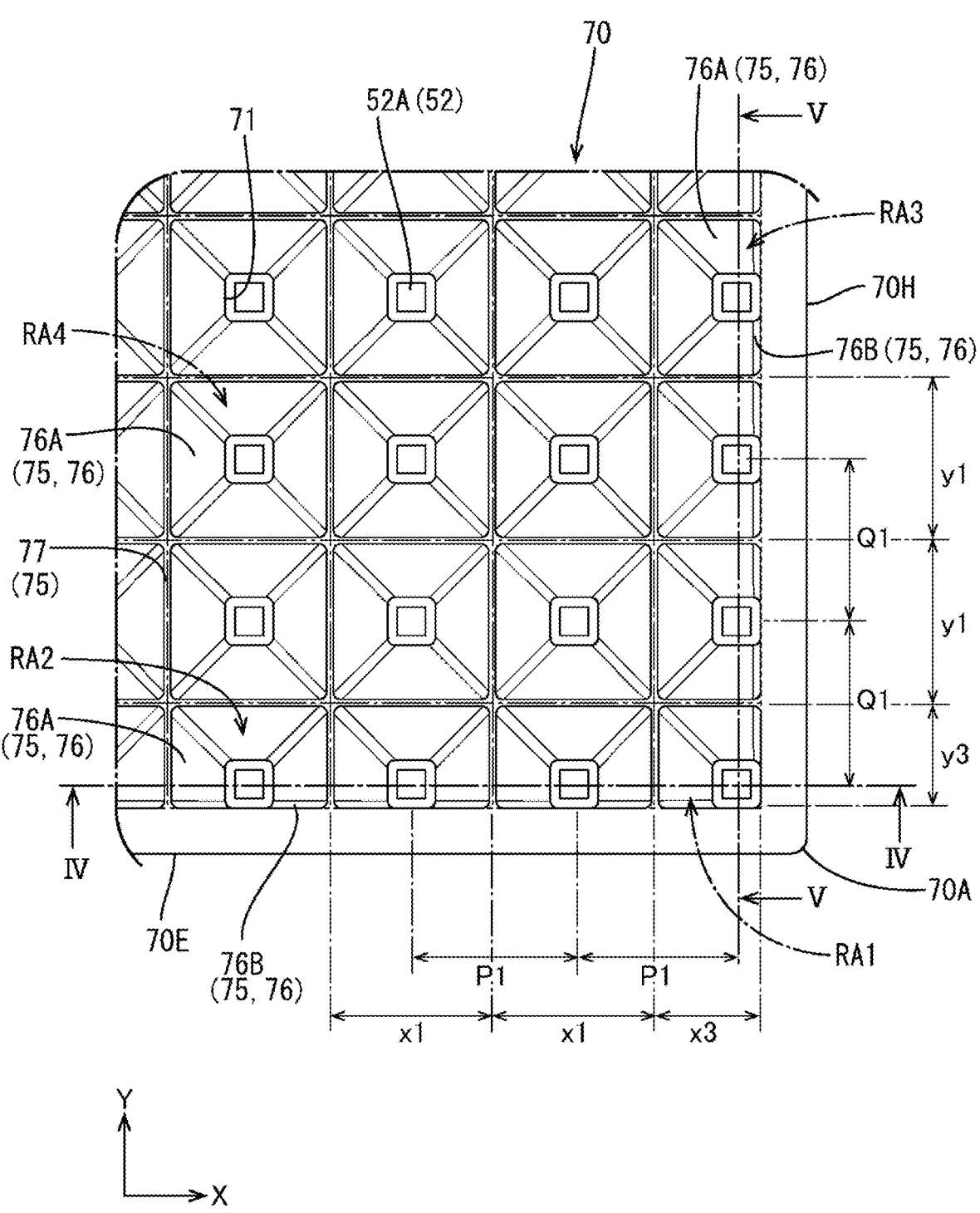
FIG. 9 is a partially enlarged plan view of an LED, an LED substrate, and the vicinity of a corner portion of a reflection member according to a modification example.
Figure 10:
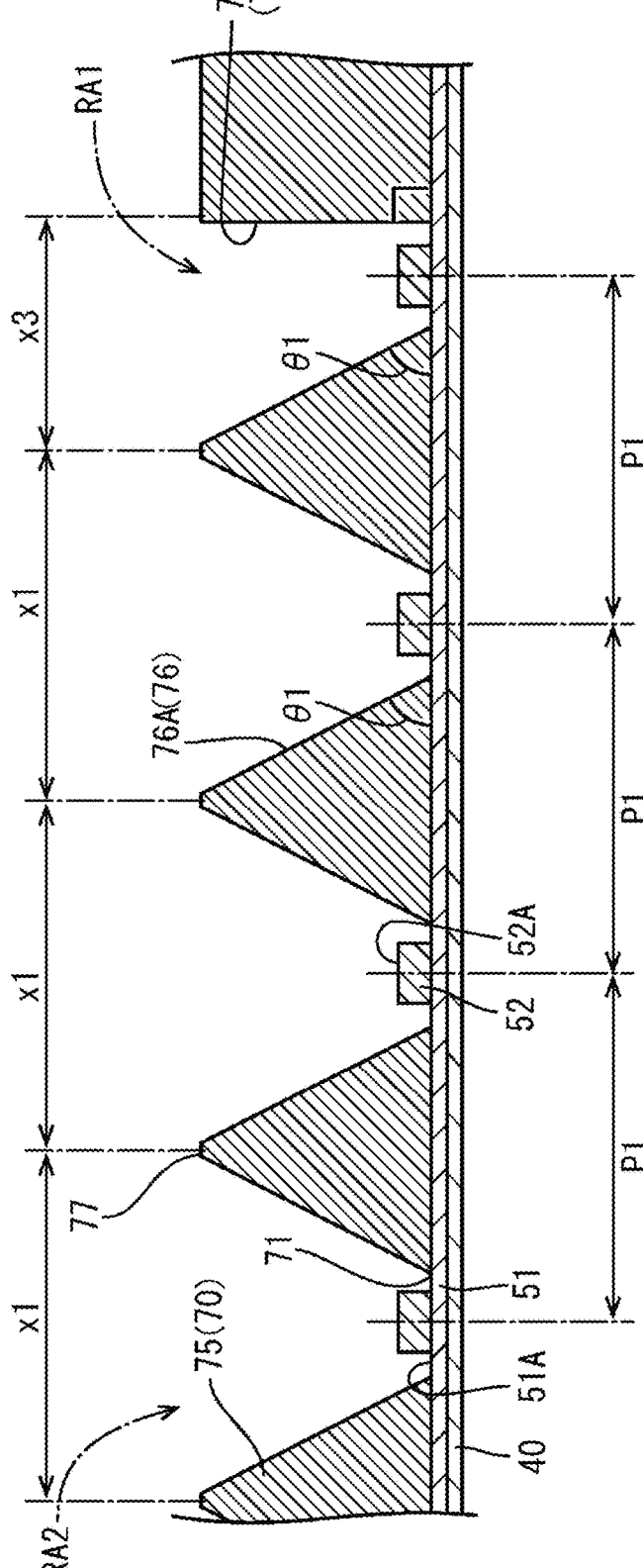
FIG. 10 is a cross-sectional view taken along line IV-IV in FIG. 9.
Figure 10:
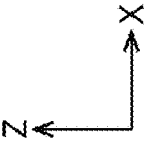

A modification example of the first embodiment will be described with reference to FIGS. 9 to 11. In the following description, the same components of a reflection member 70 as those of the reflection member 60 according to the first embodiment are denoted by reference numerals obtained by adding 10 to the reference numerals in the first embodiment, and only different components will be described.

In the reflection member 70 of the modification example, in the first reflective region RA1, the second reflective region RA2, and the third reflective region RA3, the angle of a wall surface 76B disposed on the outer peripheral side of the reflection member 70 is formed to be perpendicular to the mounting surface 51A of the LED substrate 51. The angles of the wall surfaces 76A other than the wall surface 76B disposed on the outer peripheral side of the reflection member 70 are set to be θ1=63 degrees, which is the same as the wall surface 76A of the fourth reflective region RA4.

With such a configuration as well, it is possible to improve brightness on the outer peripheral side where the brightness is low in the backlight device 30 in the related art, and brightness unevenness is curbed.

Second Embodiment

Next, a second embodiment will be described with reference to FIGS. 12 to 16. Only components that are different from the first embodiment will be described below, the same components as those in the first embodiment are denoted by reference numerals obtained by adding 100 to the reference numerals in the first embodiment, and repeated descriptions will be omitted.

Figure 12:
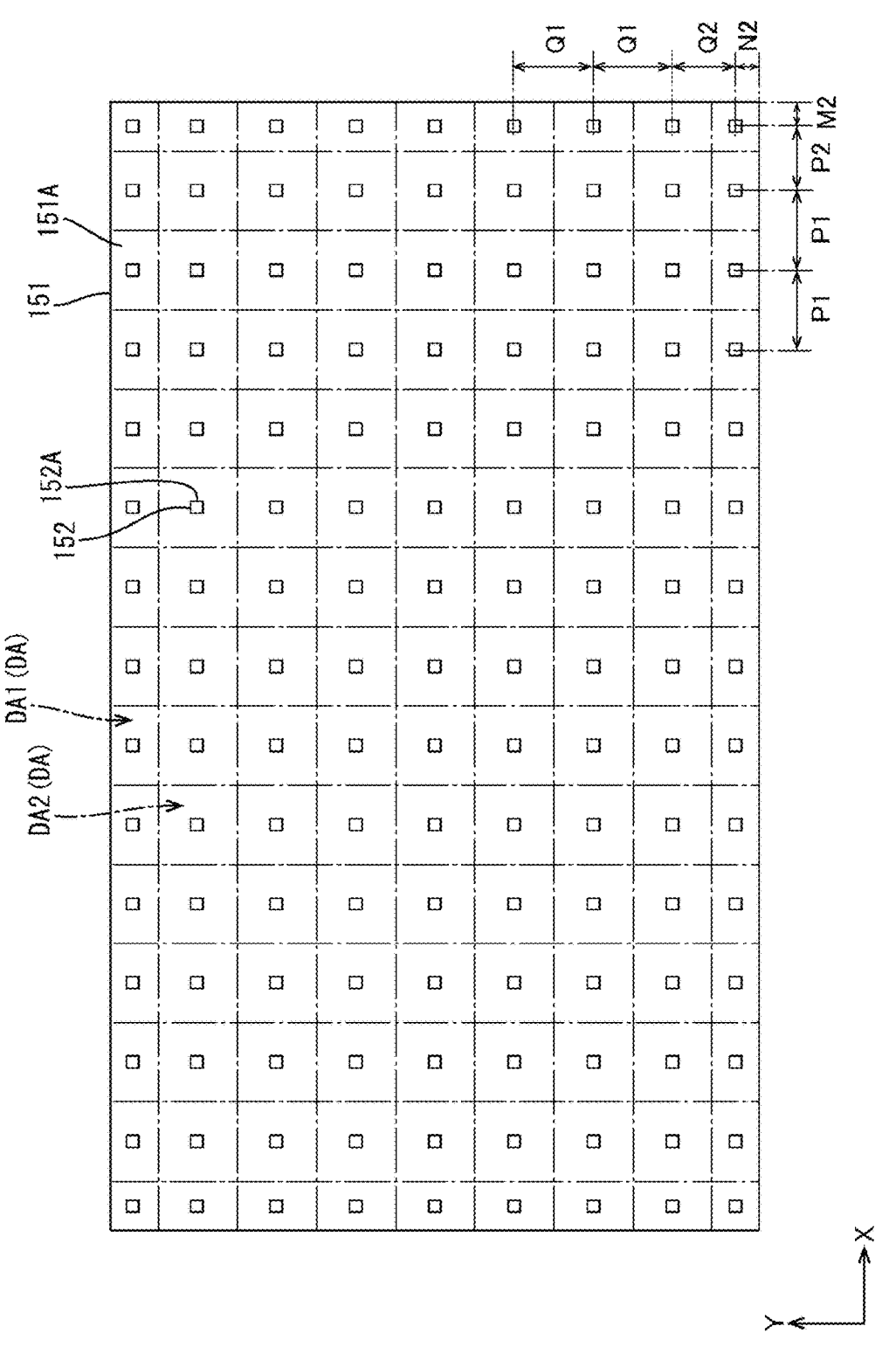
FIG. 12 is a plan view of an LED and an LED substrate according to a second embodiment.

In a backlight device 130 of this embodiment, the position of an LED 152 disposed in a dimming region DA1 including the outer peripheral edge portion of an LED substrate 151 is different from that in the first embodiment. More specifically, as illustrated in FIG. 12, the dimming region DA1 including the outer peripheral edge portion of the LED substrate 151 has an area smaller than that of a dimming region DA2 on the inner side thereof, and the LED 152 disposed in the dimming region DA1 is disposed in the central portion in each dimming region DA similarly to an LED 152 disposed in the dimming region DA2 (see FIG. 12). That is, pitches of the LEDs 152 at both ends in the row direction and the column direction (a pitch P2 in the X-axis direction and a pitch Q2 in the Y-axis direction) are smaller than the pitch of the LED 152 at the central portion (a pitch P1 in the X-axis direction and a pitch Q1 in the Y-axis direction) (P1>P2, Q1>Q2).

Figure 13:
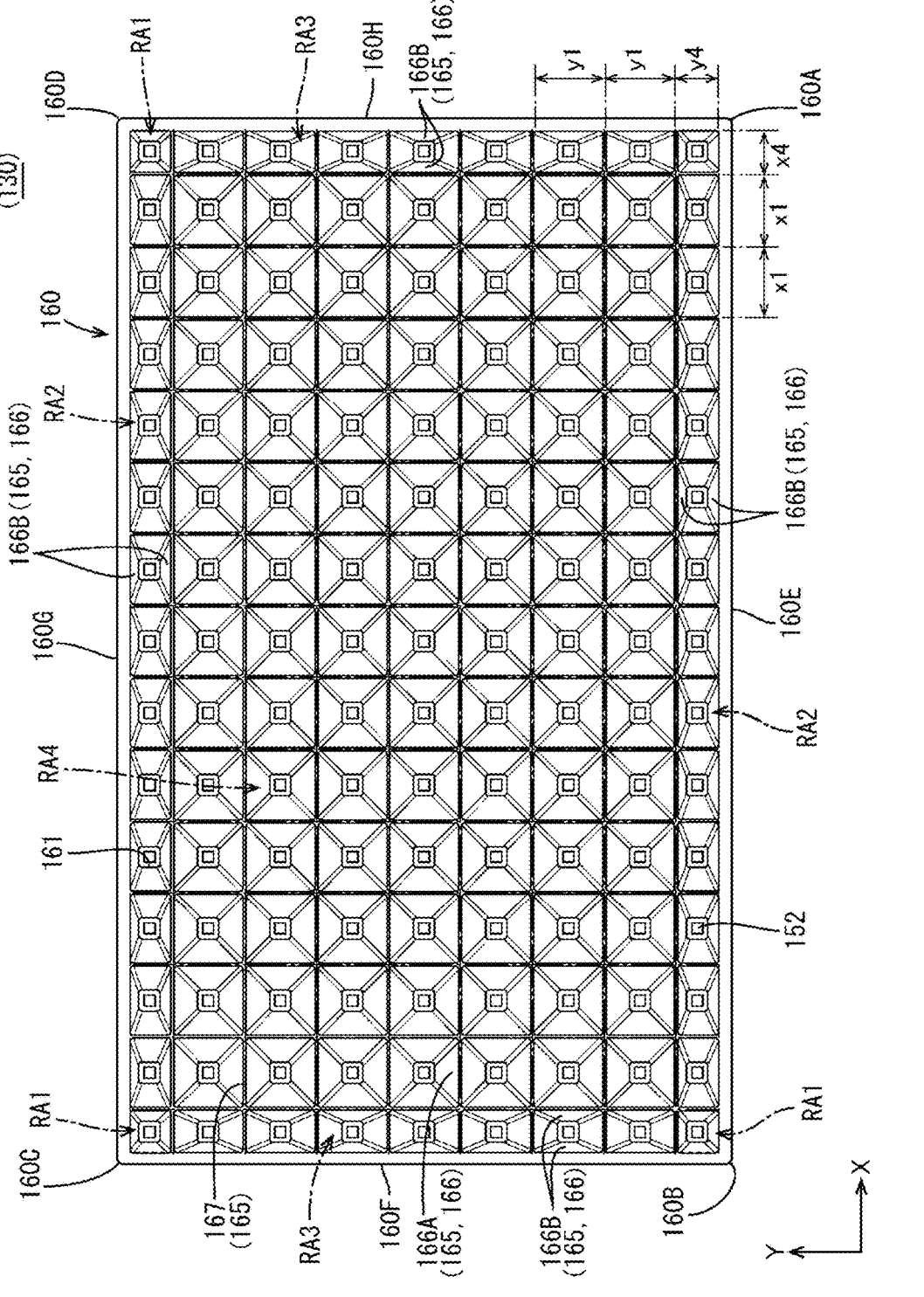
FIG. 13 is a plan view of an LED, an LED substrate, and a reflection member.
Figure 14:
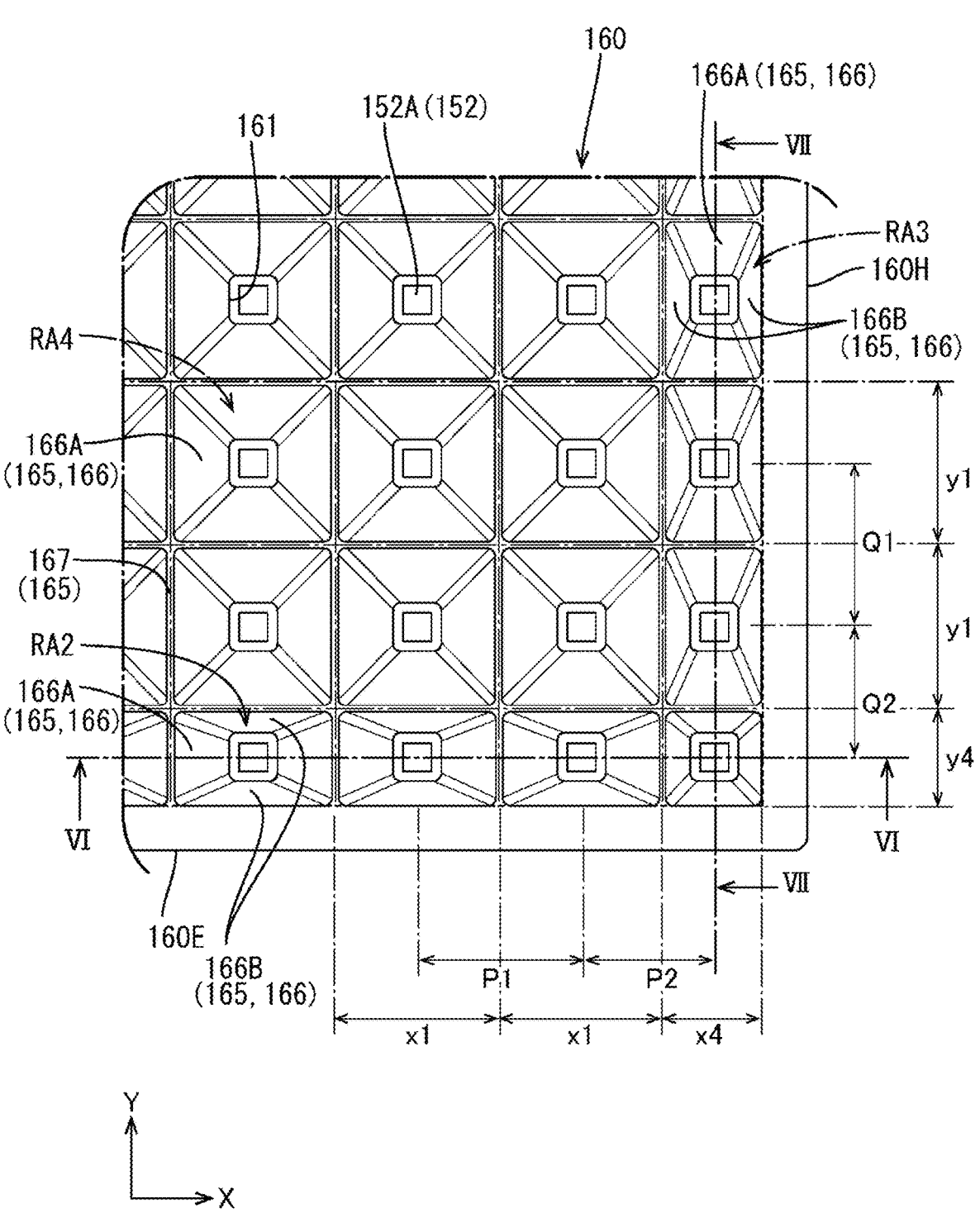
FIG. 14 is a partially enlarged plan view of an LED, an LED substrate, and the vicinity of a corner portion of a reflection member.
Figure 15:
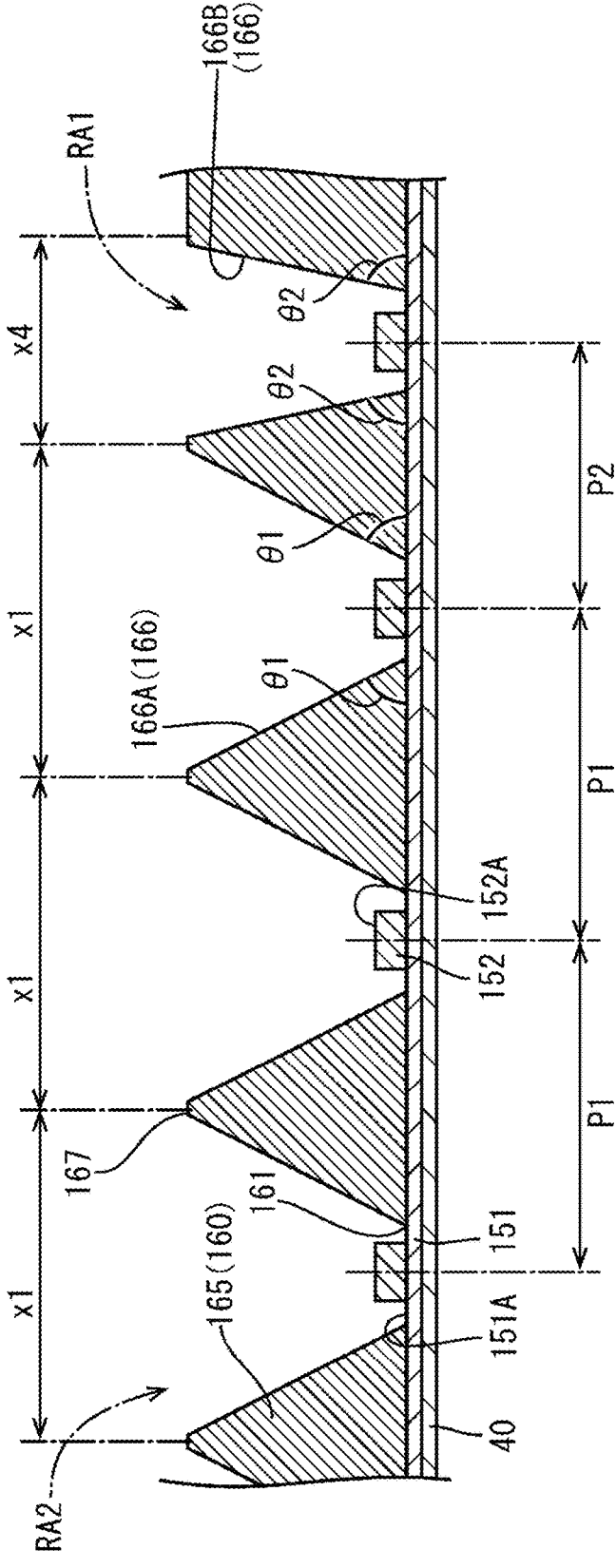
FIG. 15 is a cross-sectional view taken along line VI-VI in FIG. 14.
Figure 15:
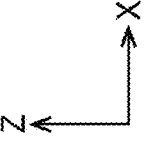
Figure 16:
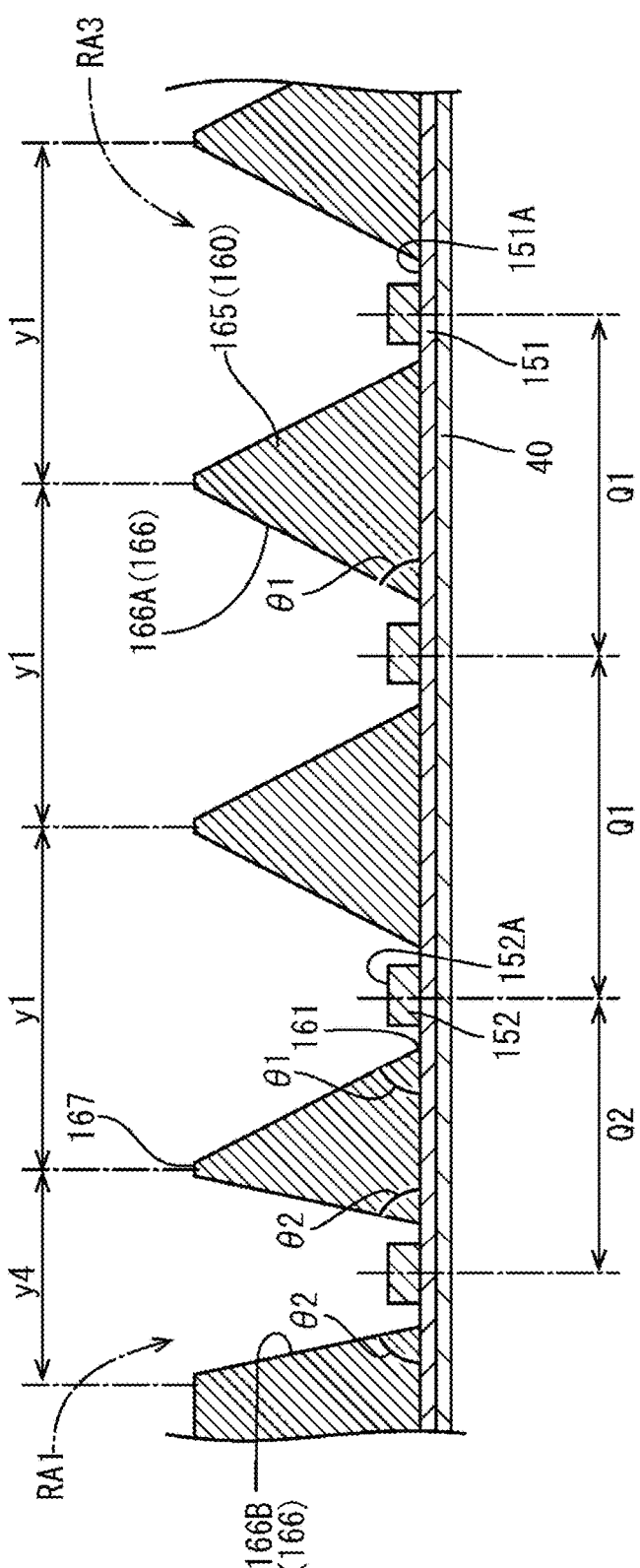
FIG. 16 is a cross-sectional view taken along line VII-VII in FIG. 14.
Figure 16:
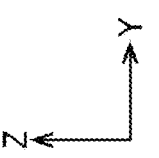

As illustrated in FIG. 13, also in a reflection member 160 of this embodiment, a first reflective region RA1, a second reflective region RA2, and a third reflective region RA3 that are located at the outermost periphery are set to have a smaller area in a plan view than that of a fourth reflective region RA4 located at the central portion (inner side of the outermost periphery). Specifically, as illustrated in FIG. 14, dimensions x4 of the first reflective region RA1 and the third reflective region RA3 in the X-axis direction are smaller than dimensions x1 of the second reflective region RA2 and the fourth reflective region RA4 in the X-axis direction (x4<x1). In addition, dimensions y4 of the first reflective region RA1 and the second reflective region RA2 in the Y-axis direction are smaller than dimensions y1 of the third reflective region RA3 and the fourth reflective region RA4 in the Y-axis direction (y4<y1).

Further, in the second reflective region RA2 and the third reflective region RA3 of a wall portion 165 configuring the reflective region RA of the reflection member 160 of this embodiment, angles of a wall surface 166B disposed on the outer peripheral side of the reflection member 160 and the wall surface 166B opposite thereto are θ2=78 degrees with respect to a mounting surface 151A of the LED substrate 151. Further, in the second reflective region RA2 and the third reflective region RA3, a wall surface 166A disposed in a direction intersecting the outer periphery of the reflection member 160 is set to θ1=63 degrees similarly to the wall surface 166A of the fourth reflective region (see FIGS. 13 to 16).

Further, in the first reflective region RA1, all of the four wall surfaces 166B are set to θ2=78 degrees with respect to the mounting surface 151A of the LED substrate 151 (θ2>θ1).

With such a configuration as well, it is possible to improve brightness on the outer peripheral side of the backlight device 130, and it is possible to obtain the backlight device 130 in which brightness unevenness is curbed.

Third Embodiment

A backlight device according to a third embodiment has a configuration in which power supplied to each LED is distributed in addition to the configuration according to the first embodiment. It is preferable that power be distributed so that the first reflective region RA1, which is most likely to have a low brightness, has the highest power and the fourth reflective region RA4, which can obtain a high brightness, has the lowest power. In this manner, it is possible to further curb brightness unevenness by combining a power distribution with the configuration of the first embodiment.

Fourth Embodiment

A backlight device according to a fourth embodiment has a configuration in which an LED having a large amount of luminous flux is installed at the outermost periphery, in addition to the configuration of the first embodiment. Since there are products having different amounts of luminous flux due to differences in performance among LEDs, brightness at the outermost periphery can be further increased by using a high-performance product at the outermost periphery.

LEDs having a large amount of luminous flux may be used for the entire reflective region at the outermost periphery or may be used only for reflective regions at corner portions. Since an LED having a large amount of luminous flux is usually expensive, it is possible to reduce manufacturing costs by using the LED only for corner portions.

Fifth Embodiment

A backlight device according to a fifth embodiment has a configuration in which low-voltage LEDs are installed at the outermost periphery, in addition to the configuration of the first embodiment. Low-voltage LEDs provide higher brightness with the same current value. Low-voltage LEDs may be used for the entire reflective region at the outermost periphery, or may be used only for reflective regions at corner portions.

Verification of Effects of Embodiments (1) With respect to the backlight device 30 obtained in the first embodiment and a backlight device of the related art (in which all of the reflective regions RA have the same area), a change in brightness with respect to a change in distance from one corner portion along a diagonal line was measured (Example 1 and Comparative Example 1).

(2) In addition, with respect to a backlight device having a power distribution as in the third embodiment and the backlight device having a power distribution as in Comparative Example 1 (related art), a change in brightness with respect to a change in distance from one corner portion along a diagonal line was measured (Example 2 and Comparative Example 2). The power distribution is as illustrated in FIG. 17, in which when the power of the first reflective region RA1 (the dimming region at the corner portion) is set to 100, the proportions of power of the other reflective regions are indicated by numerals.

(3) With respect to a backlight device in which an LED having a large amount of luminous flux (an LED having an average amount of luminous flux of 1.19 times that of the LED used in Example 1) is installed at the outermost periphery as in the fourth embodiment, a change in brightness with respect to a change in distance from one corner portion along a diagonal line was measured (Example 3).

(4) With respect to a backlight device in which a low-voltage LED (an LED having an average voltage of 0.88 times that of the LED used in Example 1) is installed at the outermost periphery as in the fifth embodiment, a change in brightness with respect to a change in distance from one corner portion along a diagonal line was measured (Example 4).

For the measurement of the brightness distribution, a two-dimensional color luminance meter CA-2000 manufactured by Konica Minolta, Inc. was used, and the brightness at a measurement point was calculated when the brightness at the central portion of the backlight device 30 was set to 1008. This means that the closer the brightness at the measurement point is to 100%, the smaller the difference in brightness from the central portion. In general, it can be said that the closer the brightness at the corner portion, where the brightness is lowest, is to 100%, the higher the brightness uniformity within a light-emitting region.

The design values of the backlight devices used in this example and the comparative example (related art) are as follows (see FIG. 5).

$$X0 = 292 \ \text{mm}$$
$$Y0 = 109.5 \ \text{mm}$$

Number of reflective regions: 36 in the X-axis direction× 14 in the Y-axis direction $$x1 = 8.25 \ \text{mm}$$
$$y1 = 8.25 \ \text{mm}$$
$$x2 = 5.7 \ \text{mm}$$
$$y2 = 5.2 \ \text{mm}$$
$$x2/x1 = 0.69$$
$$y2/y1 = 0.63$$

x0=8.1 mm (the length in the X-axis direction of a reflective region of a backlight device of the related art)

y0=7.8 mm (the length in the Y-axis direction of the reflective region of the backlight device of related art)

Figure 18:
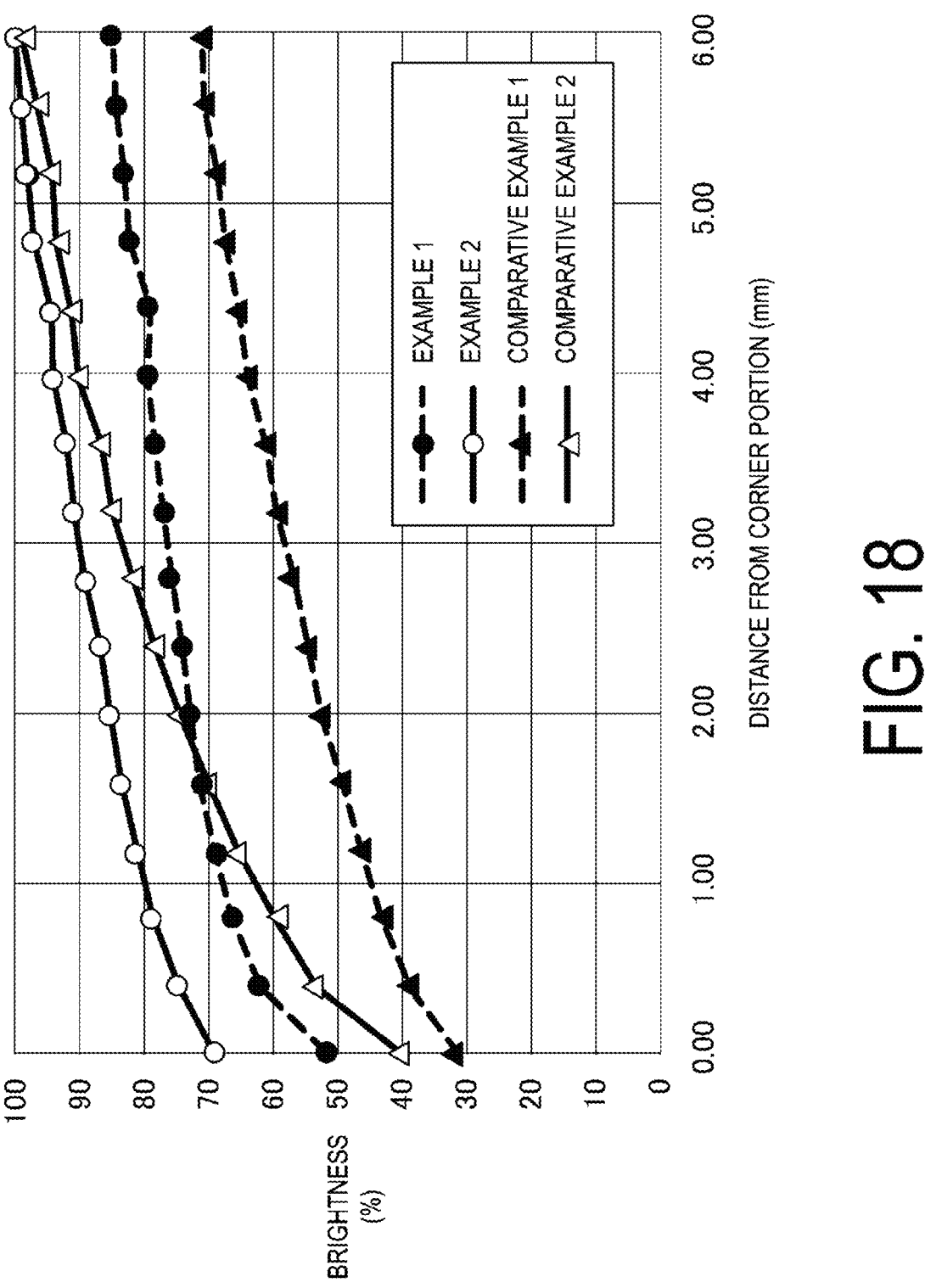
FIG. 18 is a diagram showing a change in brightness with respect to a distance from a corner portion in Examples 1 and 2.

As shown in FIG. 18, in Example 1, the brightness of the outer peripheral portion was improved as a whole as compared with Comparative Example 1. In particular, the brightness at the outermost periphery (distance from the corner portion=0 mm) was 52%, which was 1.6 times higher than 32% in Comparative Example 1.

Figure 19:
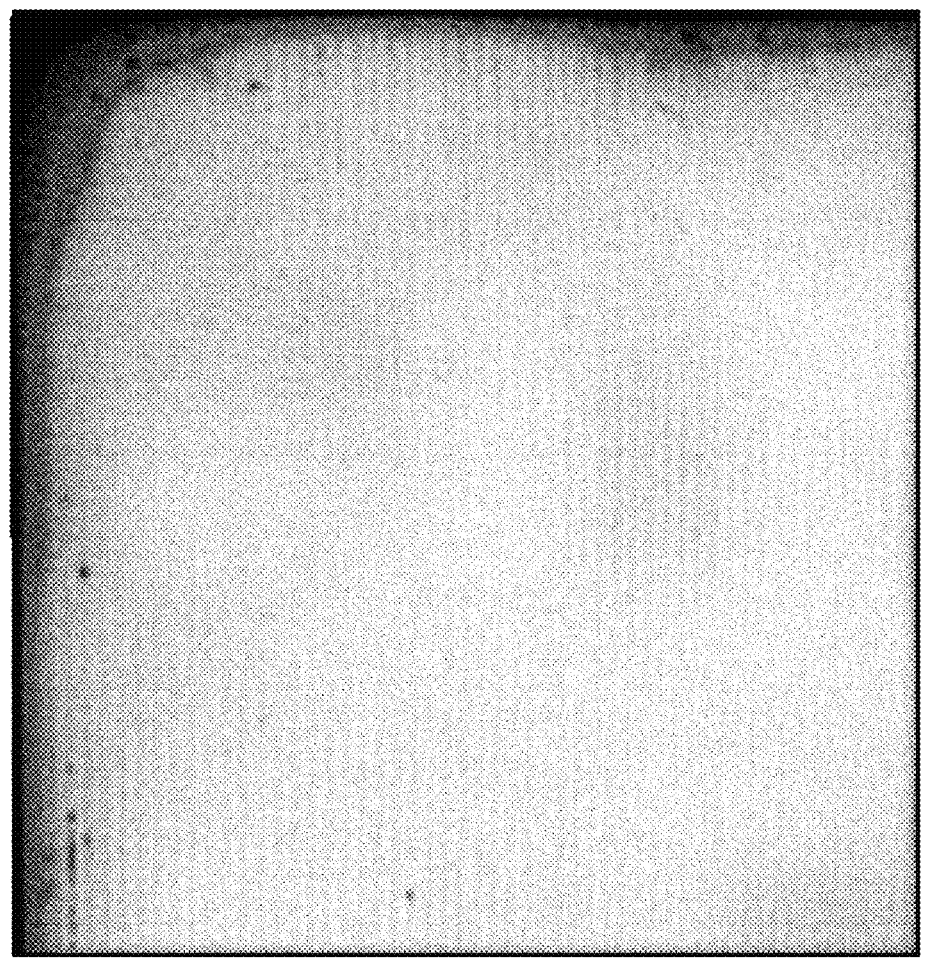
FIG. 19 is a diagram illustrating a change in brightness of a backlight device according to Example 1.
Figure 20:
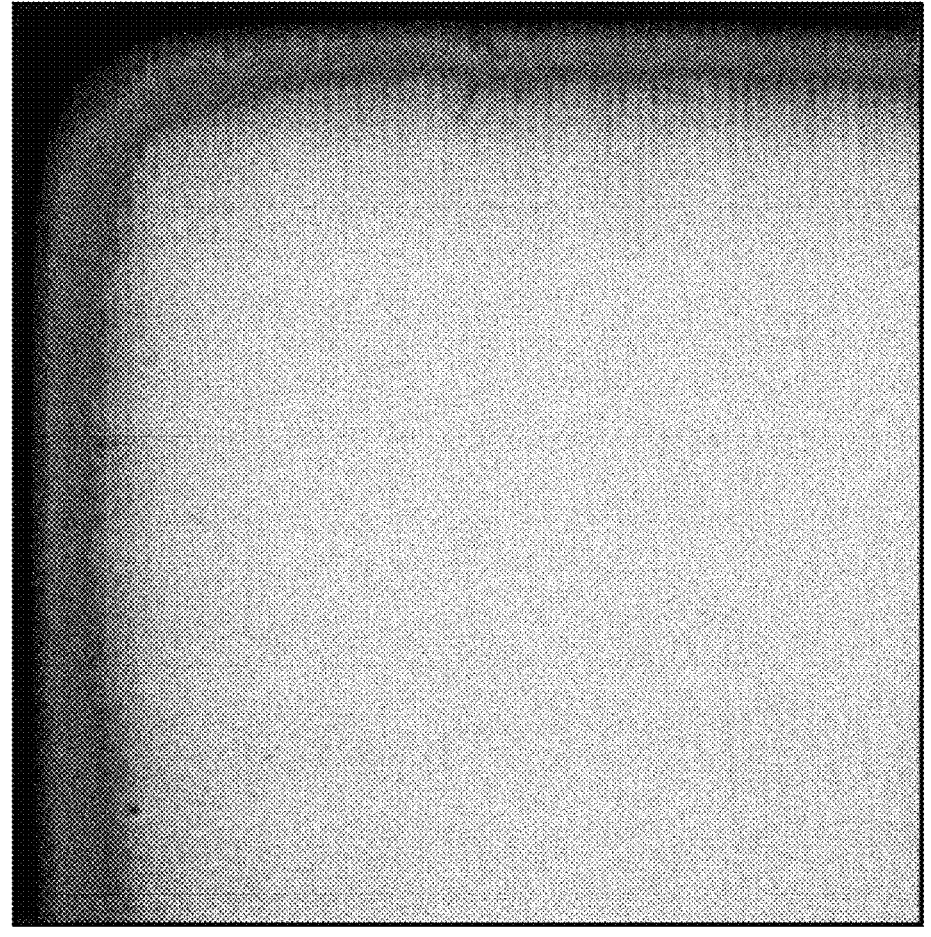
FIG. 20 is a diagram illustrating a change in brightness of a backlight device according to Comparative Example 1.

Further, in Example 2 in which a power distribution was applied, the brightness of the outer peripheral portion was further improved. In particular, the brightness at the outermost periphery was increased 1.33 times that in Example 1, that is, from 52% to 69%. Also, in Comparative Example 2, the brightness increased 1.28 times that in Comparative Example 1, that is, from 32% to 41%. However, since the original brightness in Example 1 was higher than that in Comparative Example 1, the brightness in Example 2 was higher than that in Comparative Example 2. FIGS. 19 and 20 are diagrams visually illustrating brightness uniformity in Example 1 and Comparative Example 1, and illustrate that the brightness uniformity is improved at the outer peripheral portion of the backlight device in Example 1.

Although it is possible to increase the brightness uniformity by further increasing a power distribution, the power consumption of an LED driver that supplies power increases as the power distribution increases, and thus, it is preferable to maintain balance. Example 2 in which the brightness uniformity is increased with a power distribution as small as possible can be said to be highly preferable.

Further, in Example 3 in which an LED having a large amount of luminous flux was used at the outermost periphery, the brightness at the corner portion increased 1.19 times that in Example 1, that is, from 52% to 62%.

Further, in Example 4 in which a low-voltage LED was used at the outermost periphery, the brightness at the corner portion was increased 1.5 times that in Example 1, that is, from 52% to 78%.

OTHER EMBODIMENTS

The disclosure is not limited to the embodiments described above and illustrated by the drawings, and embodiments such as those described below are also included within the technical scope of the disclosure.

(1) In the above-described embodiment, the wall portion 65 is inclined with respect to the mounting surface 51A of the LED substrate 51, but a configuration in which the wall portion is not inclined is also included in the technical scope.

Figure 21:
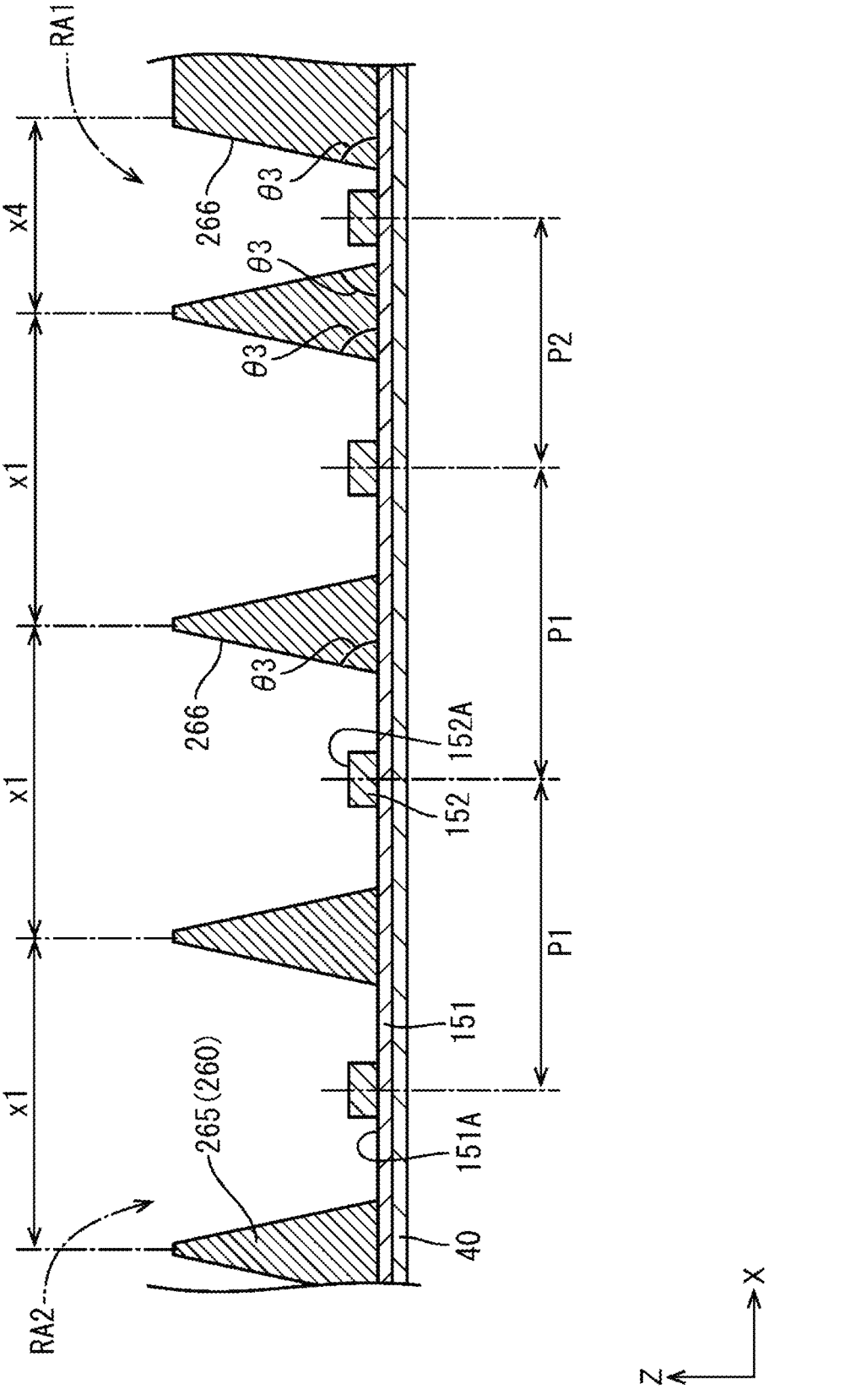
FIG. 21 is a partially enlarged cross-sectional view of an LED, an LED substrate, and a reflection member according to another embodiment.

(2) For example, as illustrated in FIG. 21, a configuration in which a wall surface 266 of a wall portion 265 of a reflection member 260 has the same inclination angle θ3 in all reflective regions is also included in the technical scope.

(3) In the above-described embodiment, the lighting device using the top emission type LED 52 is described, but a side emission type LED in which a reflection surface is formed on the upper surface thereof may be adopted. The side emission type LED is characterized in that although the amount of luminous flux is somewhat reduced, a lighting device can be made thinner by efficiently diffusing the luminous flux using a reflecting wall.

(4) In Example 3 and Example 4, the LEDs having a large amount of luminous flux and the low-voltage LEDs are disposed over the entire area, but a configuration in which they are disposed only at the corner portions of the LED substrate may be adopted.

(5) The pitch of the dimming regions DA and the number of LEDs 52 included in each dimming region DA can be changed as appropriate depending on the screen size of the liquid crystal panel 20, the purpose, and the required accuracy.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A lighting device comprising:
   a plurality of light sources disposed side-by-side in a row direction and a column direction in one plane;
   a substrate on which the plurality of light sources is mounted; and
   a reflection member disposed covering a mounting surface of the substrate, wherein the reflection member includes:
   a plurality of insertion holes through which light sources of the plurality of light sources are respectively inserted, and
   a plurality of wall portions surrounding corresponding insertion holes of the plurality of insertion holes, wherein:
   a plane of the reflection member is partitioned into a plurality of reflective regions, in a lattice pattern, by the plurality of wall portions, the plurality of reflective regions includes a first reflective region, a second reflective region, a third reflective region, and a fourth reflective region,
   the first, second, and third reflective regions are located at an outermost periphery of the reflection member and have a smaller area in a plan view than an area of the fourth reflective region that is located at a central portion of the reflection member,
   dimensions of the first reflective region and the third reflective region, in an X-axis direction in a plan view of the reflection member, are smaller than dimensions of the second reflective region and the fourth reflective region in the X-axis direction in the plan view of the reflection member,
   dimensions of the first reflective region and the second reflective region, in a Y-axis direction vertical to the X-axis direction in the plan view of the reflection member, are smaller than dimensions of the third reflective region and the fourth reflective region in the Y-axis direction,
   in wall portions of the second reflective region and the third reflective region comprising the reflection member, an angle of a wall surface disposed on an outer peripheral side of the reflection member is identical to an angle of a wall surface opposite thereto,
   in the second reflective region and the third reflective region, an angle of a wall surface disposed in a direction intersecting the outer periphery of the reflection member is identical to an angle of a wall surface of the fourth reflective region,
   the first reflective region comprises four identical wall surfaces,
   the plurality of light sources is respectively disposed inside the plurality of reflective regions, and
   an outer reflective region of the plurality of reflective regions in the lattice pattern, that is located at an outer periphery of the plurality of reflective regions in the lattice pattern, has an area smaller than an area of an inner reflective region of the plurality of reflective regions in the lattice pattern, that is located on an inner side of the outer reflective region.

2. The lighting device according to claim 1,
   wherein the plurality of light sources is arranged at the same pitch,
   a light source of the plurality of light sources is disposed at a central portion of the inner reflective region, and
   a light source of the plurality of light sources, that is in the outer reflective region, is disposed closer to the outer peripheral side of the reflection member.

3. The lighting device according to claim 1,
   wherein the plurality of light sources is respectively disposed at central portions of the plurality of reflective regions.

4. The lighting device according to claim 1,
   wherein each of the plurality of wall portions comprises an inclined shape, allowing a corresponding reflective region, in the plurality of reflective regions, to spread from a side of the substrate toward a side of a distal end in a protrusion direction of the plurality of wall portions.

5. The lighting device according to claim 4,
   wherein a wall portion of the plurality of wall portions in the outer reflective region has a larger inclination angle with respect to the substrate than a wall portion of the plurality of wall portions in the inner reflective region.

6. The lighting device according to claim 1, wherein a higher power is applied to a light source of the plurality of light sources disposed in the outer reflective region than to a light source of the plurality of light sources disposed in the inner reflective region.

7. The lighting device according to claim 1, wherein a light source of the plurality of light sources disposed in the outer reflective region has a larger amount of luminous flux than a light source of the plurality of light sources disposed in the inner reflective region.

8. The lighting device according to claim 1, wherein a light source of the plurality of light sources disposed in the outer reflective region has a lower voltage than a light source of the plurality of light sources disposed in the inner reflective region.

\* \* \* \* \*